US008831952B2

(12) United States Patent
Fujisawa

(10) Patent No.: US 8,831,952 B2
(45) Date of Patent: Sep. 9, 2014

(54) VOICE INPUT DEVICE

(75) Inventor: Yuki Fujisawa, Toyoake (JP)

(73) Assignee: Denso Corporation, Kariya (JP)

( * ) Notice: Subject to any disclaimer, the term of this patent is extended or adjusted under 35 U.S.C. 154(b) by 241 days.

(21) Appl. No.: 13/447,578

(22) Filed: Apr. 16, 2012

(65) Prior Publication Data

US 2012/0271636 A1 Oct. 25, 2012

(30) Foreign Application Priority Data

Apr. 25, 2011 (JP) ................................. 2011-097408

(51) Int. Cl.
*G10L 21/00* (2013.01)
*G10L 15/22* (2006.01)

(52) U.S. Cl.
CPC ........... *G10L 15/22* (2013.01); *G10L 2015/227* (2013.01)
USPC ............... 704/270; 704/9; 704/275; 704/272; 704/270.1; 704/235; 704/231; 704/200; 715/835; 455/575.2; 375/130

(58) Field of Classification Search
USPC .......... 704/270, 9, 275, 272, 270.1, 235, 231, 704/200; 715/835; 455/575.2; 375/130
See application file for complete search history.

(56) References Cited

U.S. PATENT DOCUMENTS

| | | | |
|---|---|---|---|
| 5,446,756 A * | 8/1995 | Mallinckrodt | 375/130 |
| 6,012,030 A * | 1/2000 | French-St. George et al. | 704/275 |
| 6,075,534 A * | 6/2000 | VanBuskirk et al. | 715/835 |
| 6,453,281 B1 * | 9/2002 | Walters et al. | 704/200 |
| 6,519,566 B1 * | 2/2003 | Boyer et al. | 704/275 |
| 6,701,095 B1 | 3/2004 | Fujimoto et al. | |
| 7,024,366 B1 * | 4/2006 | Deyoe et al. | 704/270.1 |
| 7,027,975 B1 * | 4/2006 | Pazandak et al. | 704/9 |
| 7,444,353 B1 * | 10/2008 | Chen et al. | 1/1 |
| 7,822,613 B2 * | 10/2010 | Matsubara et al. | 704/275 |
| 8,015,014 B2 * | 9/2011 | Wang et al. | 704/275 |
| 2002/0013701 A1 * | 1/2002 | Oliver et al. | 704/231 |
| 2002/0026279 A1 | 2/2002 | Kato | |
| 2007/0083366 A1 * | 4/2007 | Peters | 704/235 |
| 2007/0094033 A1 * | 4/2007 | Nagashima et al. | 704/272 |
| 2007/0135187 A1 * | 6/2007 | Kreiner et al. | 455/575.2 |
| 2008/0300886 A1 * | 12/2008 | Patch | 704/275 |

FOREIGN PATENT DOCUMENTS

| | | |
|---|---|---|
| JP | 2001-022370 | 1/2001 |
| JP | 2005-321488 | 11/2005 |
| JP | 2006-011002 | 1/2006 |
| JP | 4487298 | 6/2010 |

* cited by examiner

*Primary Examiner* — Michael Colucci
(74) *Attorney, Agent, or Firm* — Harness, Dickey & Pierce, PLC

(57) ABSTRACT

A voice input device includes: a mastery level identifying device identifying a mastery level of a user with respect to voice input; and an input mode setting device switching a voice input mode between a guided input mode and an unguided input mode. In the guided input mode, preliminary registered contents of the voice input are presented to the user. The input mode setting device sets the voice input mode to the unguided input mode at a starting time when the voice input device starts to receive the voice input. The input mode setting device switches the voice input mode from the unguided input mode to the guided input mode at a switching time. The input mode setting device sets a time interval between the starting time and the switching time in proportion to the mastery level.

13 Claims, 17 Drawing Sheets

FIG. 2

```
                    ┌─16
        ┌─────────────────┐
        │     STOR D      │
        ├─────────────────┤
        │  M LEVEL INF    │
        ├─────────────────┤
        │   COM TABLE     │
        ├─────────────────┤
        │ SW TIMING INF   │
        ├─────────────────┤
        │OPE HIER LAYER INF│
        └─────────────────┘
```

FIG. 3

| SPEECH CONT OF OPE | OPE COM |
|---|---|
| SPEECH CONT 0001 | COM 0001 |
| SPEECH CONT 0002 | COM 0002 |
| SPEECH CONT 0003 | COM 0003 |
| ⋮ | ⋮ |

FIG. 4

| M LEVEL | SW TIMING (TIME FROM ST TO SW) |
|---|---|
| LEVEL 1 | T=0sec |
| LEVEL 2 | T=5sec |
| LEVEL 3 | T=15sec |

FIG. 5

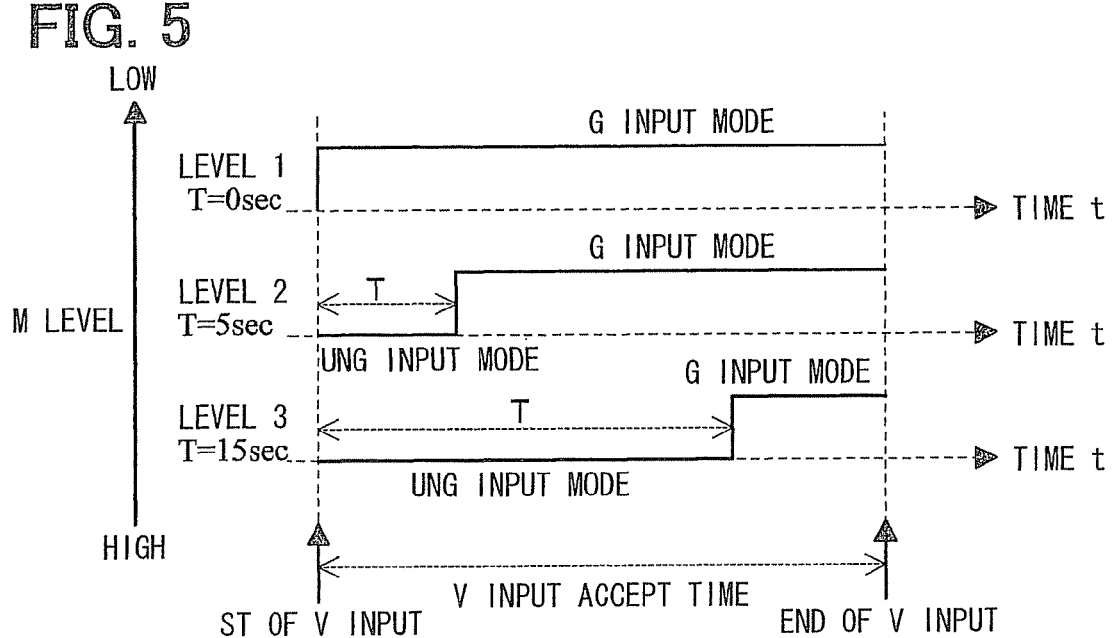

FIG. 9

| TYPE | OPE HIER LAYER | G SCREEN | G VOICE | OPE COM EXE IN G INPUT MODE | OPE COM EXE IN UNG INPUT MODE |
|---|---|---|---|---|---|
| — | TOP | SCREEN TOP | VOICE TOP | COM 0001, COM 0002, … | PART OF COM IN HIH HIER LAYER OF EACH TYPE |
| TYPE A (NAVI) | A00 | SCREEN a00 | VOICE a00 | COM 0011, COM 0012, … | PART OF COM OF TYPE A |
| | A10 | SCREEN a10 | VOICE a10 | COM 0018, COM 0019, … | |
| | A11 | SCREEN a11 | VOICE a11 | COM 0026, COM 0027, … | |
| | … | … | … | … | |
| | A20 | SCREEN a20 | VOICE a20 | COM 0082, COM 0083, … | |
| | A21 | SCREEN a21 | VOICE a21 | COM 0092, COM 0093, … | |
| | … | … | … | … | |
| | A30 | SCREEN a30 | VOICE a30 | COM 0130, COM 0131, … | |
| | A31 | SCREEN a31 | VOICE a31 | COM 0139, COM 0140, … | |
| | … | … | … | … | |
| TYPE B (AUDIO) | B00 | SCREEN b00 | VOICE b00 | COM 0189, COM 0190, … | PART OF COM OF TYPE B |
| | … | … | … | … | |
| TYPE C (A/C) | C00 | SCREEN c00 | VOICE c00 | COM 0255, COM 0256, … | PART OF COM OF TYPE C |
| … | … | | | … | … |

FIG. 21

| USER | USER INF |
|---|---|
| USER A | USR INF a |
| USER B | USR INF b |
| USER C | USR INF c |
| USER D | USR INF d |
| ⋮ | ⋮ |

FIG. 22

| USER | M LEVEL |
|---|---|
| USER A | 1 |
| USER B | 3 |
| USER C | 1 |
| USER D | 2 |
| ⋮ | ⋮ |

FIG. 23

| VEH SIT | COR PARA A |
|---|---|
| APPR INTERSEC | 4 |
| BACK ROAD RUN | 3 |
| COMMUTE H RUN | 3 |
| ⋮ | ⋮ |

FIG. 24

| USER OPE SIT | COR PARA B |
|---|---|
| OPE ST WHEEL | 3 |
| OPE ACCEL PEDAL | 2 |
| OPE BRAKE PEDAL | 2 |
| V INPUT CONC NAME | 3 |
| ⋮ | ⋮ |

FIG. 25

| TYPE | OPE HIER LAYER | COR PARA C |
|---|---|---|
| — | TOP | 2 |
| TYPE A (NAVI) | A00 | 1 |
| | A10 | 1 |
| | A11 | 4 |
| | ⋮ | ⋮ |
| | A20 | 1 |
| | A21 | 3 |
| | ⋮ | ⋮ |
| TYPE B (AUDIO) | B00 | 1 |
| | ⋮ | ⋮ |
| TYPE C (A/C) | C00 | 1 |
| | ⋮ | ⋮ |
| ⋮ | ⋮ | ⋮ |

FIG. 26

| REG USER | V INPUT PERF VAL (COR PARA D) |
|---|---|
| USER A | 1.4 |
| USER B | 8.5 |
| USER C | 1.0 |
| USER D | 4.2 |
| ⋮ | ⋮ |

VOICE INPUT DEVICE

CROSS REFERENCE TO RELATED APPLICATION

This application is based on Japanese Patent Application No. 2011-97408 filed on Apr. 25, 2011, the disclosure of which is incorporated herein by reference.

TECHNICAL FIELD

The present disclosure relates to a voice input device.

BACKGROUND

When a beginner uses a conventional voice input device, he/she may have no idea about what words he/she should bring out. To cope with such a situation, some conventional voice input devices are provided with a guidance function (for example, Patent Document 1). Some of them are provided with even a guidance function for displaying the contents of speech that can be inputted in list form on a screen. Thus when voice input is accepted, a user can select one from among the displayed contents of speech and bring out the words.

[Patent Document 1] JP-A-2001-142486

However, the above-mentioned guidance function is very helpful to beginners who have not gotten accustomed to using the voice input function but it is bothersome to users who have already gotten accustomed to using the voice input function. Display of the contents of speech in list form repeatedly appears. A user who has already gotten accustomed to using the voice input function can turn off the guidance function to eliminate this botheration. This makes the operation bothersome. For example, when the user actually has trouble in voice input, he/she must manually turn on the guidance function and turn it off again after use.

SUMMARY

It is an object of the present disclosure to provide a voice input device in which the following is implemented: a guidance function is timely carried out for users who have gotten accustomed to using a voice input function and users who have not gotten accustomed to using the function and botheration for users can be eliminated.

According to an example aspect of the present disclosure, a voice input device for receiving a voice input from a user and for executing an operation command based on the voice input, includes: a mastery level identifying device identifying a mastery level of the user with respect to the voice input; and an input mode setting device switching and setting a voice input mode between a guided input mode and an unguided input mode. In the guided input mode, preliminary registered contents of the voice input are presented to the user. In the unguided input mode, the preliminary registered contents of the voice input are not presented. The input mode setting device sets the voice input mode to the unguided input mode at a starting time when the voice input device starts to receive the voice input. The input mode setting device switches the voice input mode from the unguided input mode to the guided input mode at a switching time. The input mode setting device sets a time interval between the starting time and the switching time in proportion to the mastery level.

In the above device, when an estimated time for which the user may be in perplexity passes, the guided input mode is automatically established and the user does not feel bothersome. Thus, the input mode is not switched to the guided input mode for beginners with such timing that a user high in the mastery level feels bothersome. For beginners, the input mode is switched to the guided input mode relatively early and this shortens the time for which he/she is in perplexity in operation; therefore, he/she will not be in perplexity about what he/she should input by voice.

BRIEF DESCRIPTION OF THE DRAWINGS

The above and other objects, features and advantages of the present disclosure will become more apparent from the following detailed description made with reference to the accompanying drawings. In the drawings:

FIG. 2 is a diagram illustrating the memory contents of the storage device in FIG. 1;

FIG. 3 is a diagram illustrating a command table in which operation commands are brought into correspondence with contents of speech for each operation;

FIG. 4 is a diagram illustrating switching timing information;

FIG. 5 is a diagram explaining switching from an unguided input mode to a guided input mode;

FIG. 9 is a diagram explaining operation hierarchical layer information;

FIG. 21 is a diagram illustrating registered user information;

FIG. 22 is a diagram illustrating mastery level information registered with respect to each user;

FIG. 23 is a diagram illustrating a first example of correction information;

FIG. 24 is a diagram illustrating a second example of correction information;

FIG. 25 is a diagram illustrating a third example of correction information;

FIG. 26 is a diagram illustrating a fourth example of correction information;

DETAILED DESCRIPTION (First Embodiment)

Figure 1:
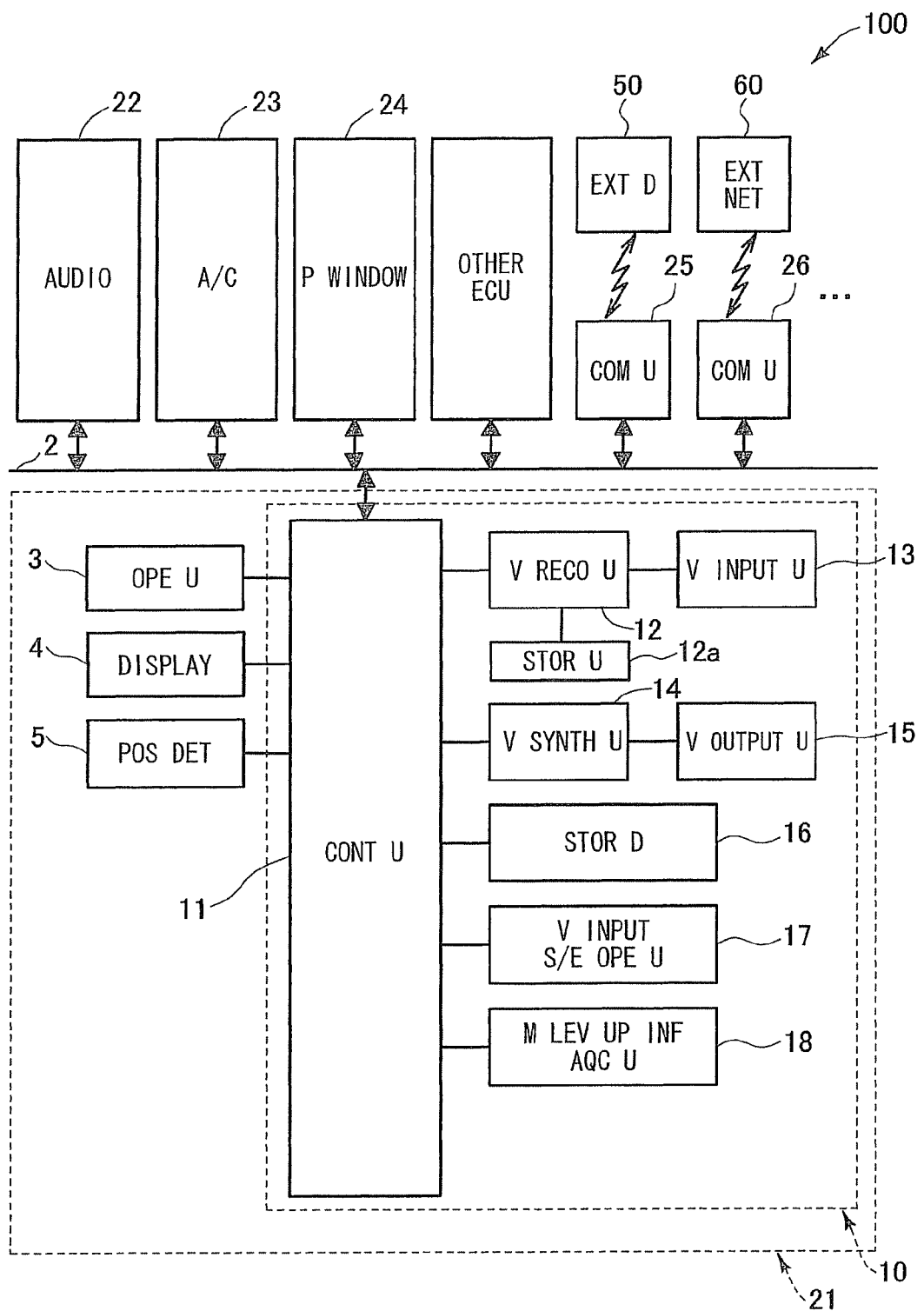
FIG. 1 is a block diagram simply illustrating the configuration of an operation input system equipped with a voice input device in a first embodiment.

FIG. 1 is a block diagram simply illustrating the configuration of a vehicle operation input system 100 including a voice input device 10 as an operation input means. The vehicle operation input system 100 in this embodiment is so configured as to include multiple in-vehicle devices mounted in a vehicle. The entire vehicle (vehicle itself) can also be considered as a voice input device 10 and further a system 100 so configured as to include the voice input device 10.

The voice input device 10 in this embodiment is basically accepted as one of the operation input devices of an automobile navigation system 21. However, the voice input device 10 is so configured that the voice input device 10 can also be used as an operation input device for other devices (systems) when connected with them through a communication means, such as an in-vehicle LAN 2. In this example, the voice input device 10 functions as an operation input device for such in-vehicle devices as an audio system 22, an air conditioner 23, and a power window device 24. That is, the following operations can be performed not only by directly operating the existing operation units (touch switch, mechanical switch, and the like) of these devices and systems 21, 22, 23, 24 but also by voice input: destination setting operation with the automobile navigation system 21, music selecting operation with the audio system 22, temperature or air quantity setting operation with the air conditioner 23, power window opening/closing operation with the power window device 24, and the like.

The voice input device 10 in this embodiment is connected with a communication unit 25 wirelessly connected to an external device 50, such as a carry-in device, through a communication means, such as in-vehicle LAN 2. Therefore, the voice input device 10 also functions as an operation input device for the external device 50. The communication unit 25 can be used as, for example, a communication device for connection with a two-way short-distance wireless network (for example, Bluetooth (trade name)). When a portable terminal device (for example, a cellular phone such as a Smartphone) is connected through this network, it can be operated.

The voice input device 10 in this embodiment is connected with a communication unit 26 wirelessly connected to an external network 60 such as a vehicle exterior network and also functions as an operation input device for the external network 60. The communication unit 26 can be used as, for example, a communication device for connection with the Internet. When the voice input device is connected with external devices through the Internet, it is possible to carry out the operation of executing an Internet application, the operation of communicating varied date between it and external devices, and other like operations.

The automobile navigation system 21 is dedicated to vehicles and has a publicly known structure in which the control unit 11 thereof is connected with the following, as illustrated in FIG. 1: a position detector 5 that detects the present position of the vehicle and a storage device (hard disk drive: hereafter also abbreviated as HDD) 16 holding map data and the like. In addition, the control unit 11 is also connected with the following: a display device (display) 4, such as LCD (Liquid Crystal Display), for displaying the vehicle present position mark, a recommended route, map data, and the like in a superimposed manner; an operation unit (operation input device) 3 for accepting operation input from a user; a voice output unit 15 for providing voice guidance; a voice input unit 13 for doing voice input; and a radio communication device (not shown) that wirelessly receives traffic information and the like from fixed stations for VICS (Vehicle Information and Communication System, registered trademark) service installed the roadside. The control unit 11 is connected with the other in-vehicle devices 22, 23, 24, ... so that communication can be carried out therebetween through a communication interface (communication I/F) and the in-vehicle LAN 2 and data and control signals can be transmitted and received therebetween.

The control unit 11 is configured based on a publicly known microcomputer including CPU, ROM, RAM, and the like none of which is shown in the drawing. In the ROM, a navigation program executed by the CPU and data required therefor are stored. In the storage device 16, map data is stored. As the map data, not only road information but also road-related information, such as traffic regulations, for each road indicated by these pieces of road information is stored in correspondence with each other. For example, information, such as one-way road, stipulated for each road is stored.

The control unit 11 carries out map display processing, route guidance processing, and the like by executing the navigation program stored in the ROM. In the map display processing, the following processing is carried out: the present position of the vehicle is computed as a set of coordinates and a traveling direction based on detection signals from the position detector 5; map data pertaining to the area in proximity to the computed present position is read from the storage device 16; and the map of a specified range and the like are displayed together with the present position in the display device 4. In the route guidance processing, the following processing is carried out: a facility as a destination is selected based on location data stored in the storage device 16 according to operation input (including voice input) to the operation unit 3 or the voice input unit 13; and route computation is carried out to automatically determine the optimum route from the present position to the destination and route guidance is provided. As techniques for automatically setting the optimum route, the Dijkstra method and the like are known.

The position detector 5 is publicly known and includes: a GPS receiver that receives transmission radio waves from artificial satellites for GPS (Global Positioning System) through a GPS antenna to detect the position, azimuth orientation, speed, and the like of the vehicle; a gyroscope that detects the magnitude of rotary motion applied to the vehicle; a distance sensor that detects the mileage from the longitudinal acceleration of the vehicle and the like; and a geomagnetic sensor that detects the traveling orientation from geomagnetism.

The voice input device 10 has a voice brought out by a user inputted thereto and executes an operation command based on the inputted voice. The voice input device 10 in FIG. 1 is so configured as to include: a voice input unit (voice input means) 12 for inputting a user's voice; a voice recognition unit (voice recognizing means) 13 that recognizes an inputted voice; and a control unit (control means) 11 that identifies a corresponding operation command (contents of control) based on a recognized voice and executes the identified operation command. The control unit 11 further outputs a voice generated by voice synthesis processing, such as TTS (Text to Speech) at a voice synthesis unit 14 from the voice output unit 15, such as a speaker.

The voice input unit 13 is a microphone to which a voice (contents of speech) brought out by a user is inputted and which converts it into voice data (voice signal). In this example, the voice (contents of speech) of the vehicle 13 driver (user) is inputted.

The voice recognition unit 12 carries out publicly known voice recognition processing, such as syntax analysis, on voice data acquired from the voice input unit 13. More specific description will be given. Contents of speech (registered contents of speech) for operation in correspondence with each operation command executed by voice input are registered beforehand as voice data for collation in a storage unit 12a. The voice recognition unit 12 compares and collates voice data inputted from the voice input unit 13 with voice data for collation specified by the control unit 11 to identify matched contents of speech for operation. Then the voice recognition unit outputs this result of identification to the control unit 11.

The control unit 11 executes an operation command based on a voice recognized at the voice recognition unit 12. That is, the control unit executes the following processing based on the result of recognition by the voice recognition unit 12 and the internal state managed by the control unit itself: the processing of giving an instruction to bring out a response voice to the voice synthesis unit 14 or a control instruction to the devices 21, 22, 23, 24, . . . to be controlled (to be operated). Specifically, the control unit identifies an operation command corresponding to contents of speech for operation identified by the voice recognition unit 12 (that is, inputted voice recognized by the voice recognition unit 12) and executes the operation command. In the storage device 16 in this example, a command table (Refer to FIG. 3) in which operation commands are brought into correspondence with each set of contents of speech for operation is stored as illustrated in FIG. 2. With respect to the contents of speech for operation identified by the voice recognition unit 12, this table is referred to identify a corresponding operation command.

The control unit 11 is further connected with a voice input start/exit operation unit (voice input start operation means and voice input exit operation means) 17 operated by a user to start or exit voice input. The voice input start/exit operation unit 17 in this embodiment is provided in the steering wheel of the vehicle and the driver as the user can easily operate it.

The control unit 11 is further connected with a mastery level update information acquisition unit (mastery level information acquiring means) 18 that acquires predetermined mastery level update information in which a user's mastery level (degree of experience) related to voice input is reflected. The control unit 11 updates a user's mastery level related to voice input (mastery level updating means) based on mastery level update information acquired by the mastery level update information acquisition unit 18. The control unit stores the updated mastery level as mastery level information in the storage device 16 (mastery level storing means: refer to FIG. 2).

The mastery level in this embodiment is so configured that the master level is identified as a higher level with increase in the length of the total time of voice input acceptance times for which the voice input unit 13 for inputting voice brought out by a user accepts voice input. As described later, the voice input unit 13 starts to accept voice input when the voice input start/exit operation unit 17 is turned on. In this example, therefore, the voice input acceptance time refers to a time from when the voice input start/exit operation unit 17 is turned on to when a predetermined time passes and the total time thereof refers to the time obtained by summing voice input acceptance times established on various occasions. The control unit 11 counts and sums the individual voice input acceptance times. In this example, that is, this voice input acceptance time is equivalent to mastery level update information and the mastery level update information acquisition unit 18 is configured as a time counting means that counts times.

The control unit 11 further establishes its own voice input mode by switching the input mode between a guided input mode and an unguided input mode (input mode setting means). In the guided input mode, contents of speech (registered contents of speech) for operation registered beforehand are presented to users. In the unguided input mode, these contents of speech (registered contents of speech) for operation are not presented.

The voice input mode is basically set as the unguided input mode when acceptance of voice input is started. However, the switching wait time T from when voice input is started to when the input mode is switched to the guided input mode is determined according to the mastery level updated based on mastery level update information acquired by the mastery level update information acquisition unit 18.

In this embodiment, switching timing information in which the above-mentioned switching wait time T and the above-mentioned mastery level are in correspondence with each other is stored in the storage device 16 (switching timing storing means). The control unit 11 switches the voice input mode based on the switching timing information. As shown in FIG. 4, the switching timing information in this embodiment discretely contains multiple levels as the mastery level and a switching wait time T is brought into correspondence with each of these levels. Then, as shown in FIG. 5, the switching wait time T and the mastery level are so determined that the input mode is switched to the guided input mode more behind start of voice input with increase in the identified mastery level. Zero switching wait time is brought into correspondence with the lowest mastery level.

Figure 8:
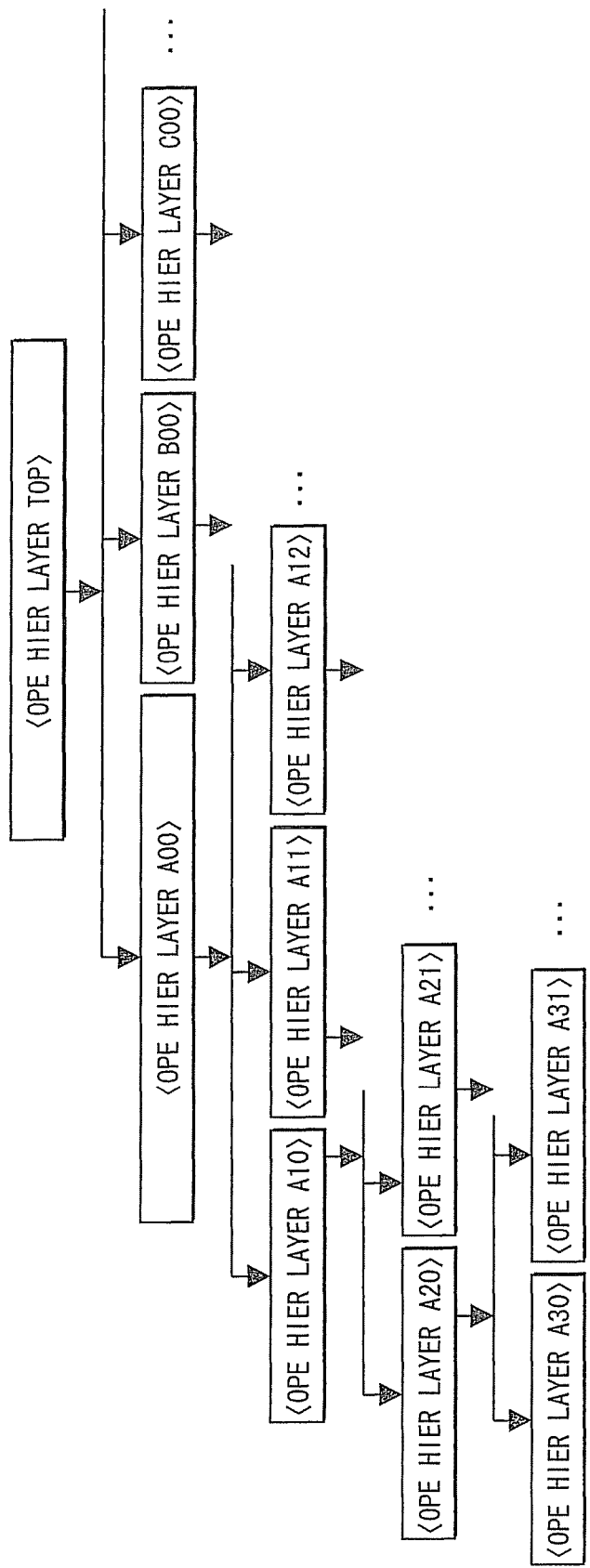
FIG. 8 is a diagram explaining operation hierarchical layers.

As illustrated in FIG. 8, this embodiment has a hierarchical structure in which multiple operation hierarchical layers are provided. These operation hierarchical layers are provided as operation commands with hierarchical layer transition commands for transition to a predetermined upper or lower hierarchical layer. The control unit 11 sets a corresponding operation hierarchical layer based on the execution of these hierarchical layer transition commands (operation hierarchical layer setting means). The operation can be caused to transition from the highest operation hierarchical layer to any lowest operation hierarchical layer by way of one or more branches by repeating the execution of the hierarchical layer transition command.

As illustrated in FIG. 9, one or more predetermined operation commands that can be executed by voice input in the guided input mode are brought into correspondence with these operation hierarchical layers. That is, in the guided input mode, only the operation commands corresponding to the current operation hierarchical layer can be executed by voice input. Each operation command need not be brought into correspondence with one operation hierarchical layer and may be brought into correspondence with multiple operation hierarchical layers. In the unguided input mode, it is possible to execute by voice input not only the operation commands corresponding to the current operation hierarchical layer but also the other operation commands. In this example, as mentioned above, more operation commands can be executed by voice input in the unguided input mode than at least in the guided input mode; therefore, the unguided input mode can also be designated as expanded input mode. In this example, the operation hierarchical layers are classified into multiple types. Therefore, it is possible to execute the following by voice input: the operation commands corresponding to the current operation hierarchical layer and all or some of the operation commands of the same type as that of the current operation hierarchical layer. In the unguided input mode, an operation command may be executable regardless of the correspondence with an operation hierarchical layer. When the correspondence between the operation hierarchical layers and the operation commands is utilized in the unguided input mode, the following measure may be taken: for example, in the highest operation hierarchical layer, it is made possible to execute by voice input all or some of the operation commands in the highest operation hierarchical layer A00 or B00 of each type.

In this embodiment, various devices (devices for vehicles in this example) are specified as the objects to be operated by the operation input device 10 and the types are classified by these devices. That is, in the unguided input mode, all or some of the operation commands of the type (device) corresponding to the current operation hierarchical layer can be executed by voice input. In this example, the automobile navigation system 21, audio system 22, air conditioner 23, power window device 24, and the like are to be operated by the control unit 11 and the operation hierarchical layers are classified with respect to each of these devices.

As shown in FIG. 9, data of a guide screen displayed in the guided input mode and a guide voice outputted in the guided input mode are brought into correspondence with each operation command. (The guide screen is a screen that presents (screen-displays) all or some of contents of speech accepted by voice input.) (The guide voice is a voice that presents (voice-outputs) all or some of contents of speech accepted by voice input.)

Hereafter, a description will be given to output sounds outputted in the unguided input mode and the guided input mode.

Figure 6:
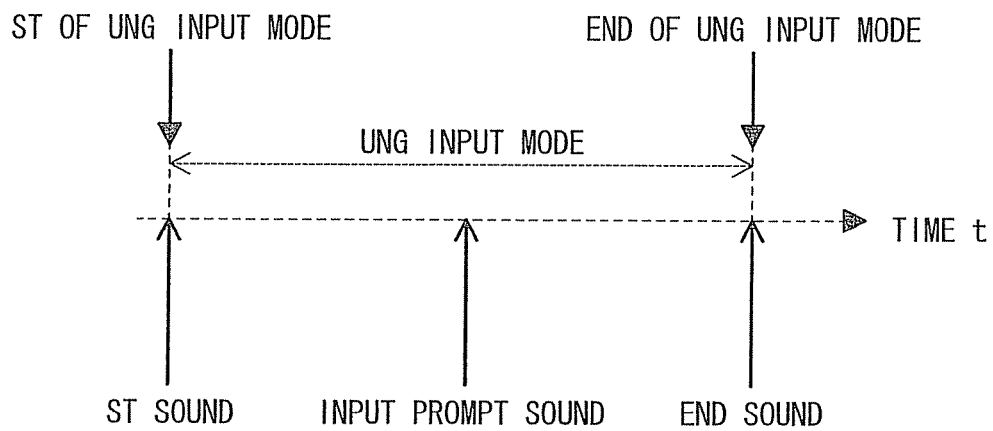
FIG. 6 is a diagram showing the output timing of an output sound outputted when the unguided input mode is established.

FIG. 6 shows the output timing of output sounds outputted when the unguided input mode is established. When the unguided input mode is established, first, a starting sound of the unguided input mode is immediately outputted from the voice output unit 15. In this embodiment, this sound is an electronic sound (starting sound) like "pong" or the like and a guidance voice is not outputted at all. If voice input has not been done yet when a predetermined time passes after the unguided input mode was started, a prompt voice prompting voice input is outputted like "Do voice input." or the like. When the unguided input mode is terminated, an ending voice (ending sound) of "Exit voice input." is outputted. These output sounds are minimum necessary sounds and are less prone to be offensive to users.

Figure 7:
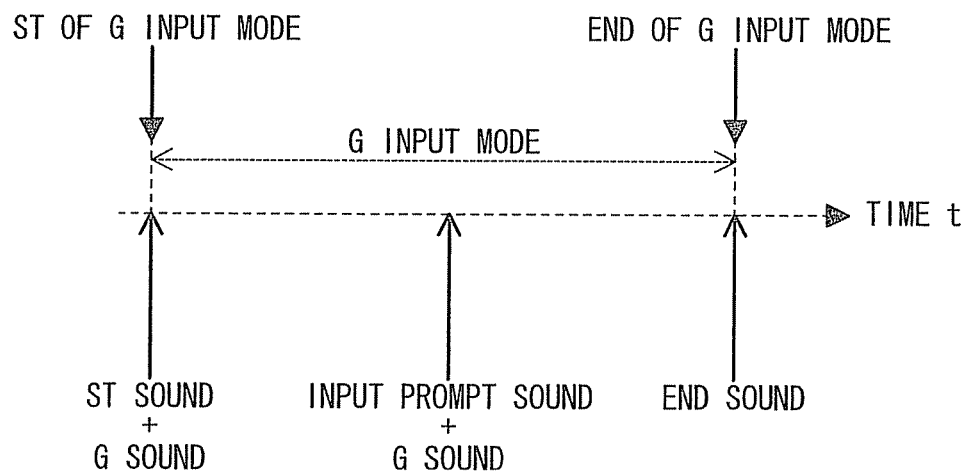
FIG. 7 is a diagram showing the output timing of an output sound outputted when the guided input mode is established.

FIG. 7 shows the output timing of output sounds outputted when the guided input mode is established. When the guided input mode is established, first, a guidance voice for use of the guided input mode is immediately outputted from the voice output unit 15 together with a starting sound of the guided input mode. In this embodiment, a guidance voice (guidance sound) prompting to input screen-displayed contents of speech by voice is outputted together with an electronic sound (starting sound) like "pong" or the like. In addition, as a guidance voice, contents of speech for operation recognized by the voice recognition unit 12 in the current operation hierarchical layer may be read aloud. If voice input has not been done yet when a predetermined time passes after the guided input mode was started, a prompt voice (input prompting sound), such as "Do voice input." or the like, prompting voice input is outputted. At this time, the following measure may be taken: it is prompted again to input screen-displayed contents of speech by voice; or a guidance voice (guidance sound) reading aloud the contents of speech for operation recognized by the voice recognition unit 12 in the current operation hierarchical layer is outputted. When the guided input mode is terminated, an ending voice (ending sound) of "Exit voice input." is outputted. In the guided input mode, voice guidance (guide voices) as output sounds is frequently more thoughtful than in the unguided input mode.

Hereafter, a description will be given to screens displayed in the unguided input mode and the guided input mode.

Figure 10:
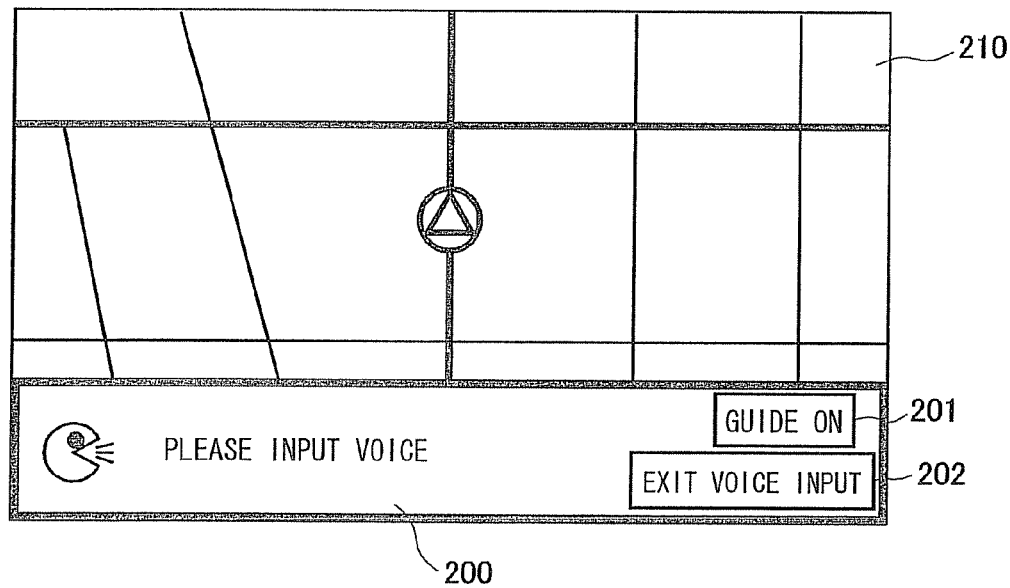
FIG. 10 is a diagram illustrating an example of a first screen display in the unguided input mode.
Figure 11:
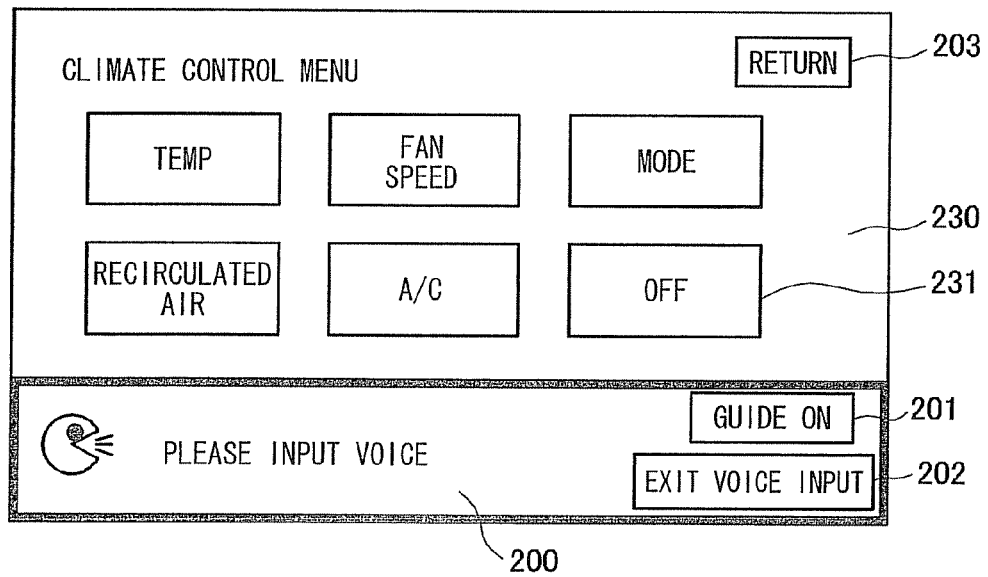
FIG. 11 is a diagram illustrating an example of a second screen display in the unguided input mode.

FIG. 10 and FIG. 11 illustrate operation screens in the unguided input mode in each operation hierarchical layer.

FIG. 10 illustrates an, example of a screen display in the highest hierarchical layer. In this example, the map screen 210 of the automobile navigation system 21 is manly displayed. In some area (lower end part in this example) thereof, there is auxiliarily a display area 200 indicating that voice input is possible by characters, a symbol, or the like. On the screen, an operation image (icon) enabling touch input is displayed so that the user can do not only voice input but also touch operation. In this example, an input mode switching operation image 201 for switching the input mode to the guided input mode and a voice input exit operation image 202 for exiting voice input are displayed. The same operations as by these operation images 201, 202 can also be performed by voice input.

FIG. 11 illustrates an example of a screen display to which the operation transitions when voice input of "climate" is done in the screen in FIG. 10 and it is a screen in the operation hierarchical layer immediately lower than that in FIG. 10. Also in this screen, an operation screen 230 for the air conditioner 23 is mainly displayed and an operation image (icon) enabling touch input is displayed so that the user can do not only voice input but also touch operation. In some area (lower end part in this example) of the screen, there is auxiliarily a display area 200 indicating that voice input is possible by characters, a symbol, or the like. On the screen, operation images (icons) enabling touch input are displayed so that the user can do not only voice input but also touch operation. In this example, multiple operation images (including a hierarchical layer transition image for transition to a lower operation hierarchical layer) 231 for performing various operations with the air conditioner are displayed on the air conditioner operation screen 230. In addition, the following are displayed on the screen: an input mode switching operation image 201 for switching the input mode to the guided input mode; a voice input exit operation image 202 for exiting voice input; and an operation image (hierarchical layer transition operation image) 203 for returning to the upper operation hierarchical layer. The same operations as by these operation images 201 to 203 can also be performed by voice input.

FIG. 12 to FIG. 15 illustrate operation screens in the guided input mode in each operation hierarchical layer.

Figure 12:
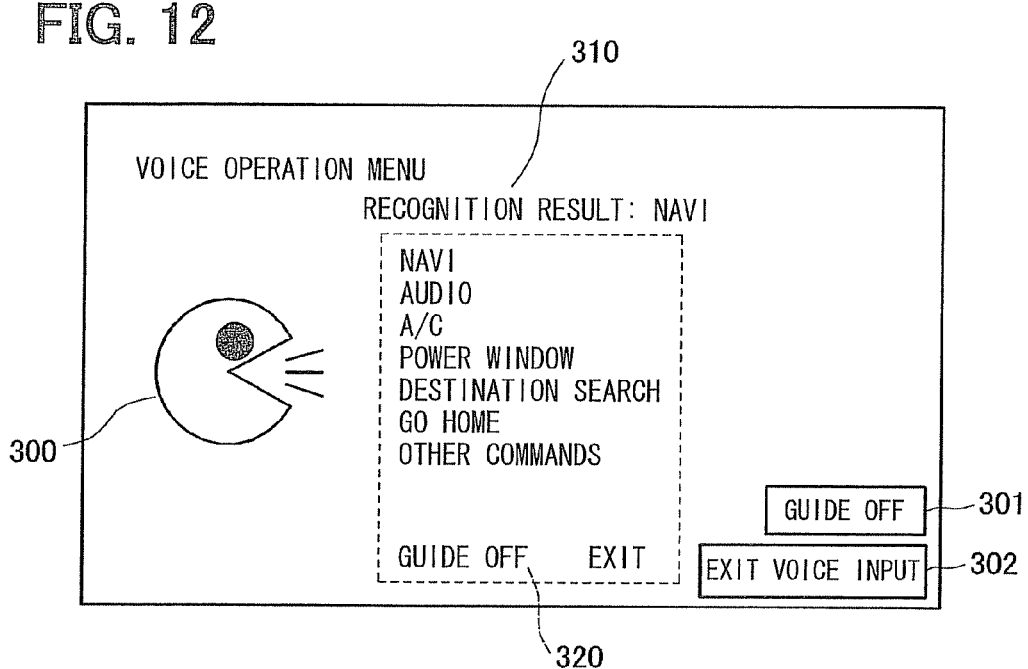
FIG. 12 is a diagram illustrating an example of a first screen display in the guided input mode.

FIG. 12 illustrates an example of a screen displayed on the display device 4 of the automobile navigation system 21 in the highest operation hierarchical layer in this embodiment. In this example, the following are provided on the screen: a display area 300 indicating that voice input is possible by characters, a symbol, or the like; a recognized voice display area 310 for displaying a recognized voice; and contents of speech presenting area 320. In addition, operation images (icons) 301, 302 enabling touch input are displayed so that the user can do not only voice input but also touch operation. In the contents of speech presenting area 320, the following are displayed in list form: contents of speech for transition to the operation hierarchical layers (operation screens) for the automobile navigation system 21, audio system 22, air conditioner 23, and power window device 24; and contents of speech corresponding to operation commands that can be executed in the highest operation hierarchical layers A00, B00, and the like for these devices (systems). In addition, the following operation images are displayed: an input mode switching operation image 301 for stopping the guided input mode and switching the input mode to the unguided input mode; and a voice input exit operation image 302 for exiting voice input. The same operations as by these operation images 301, 302 can also be performed by voice input.

Figure 13:
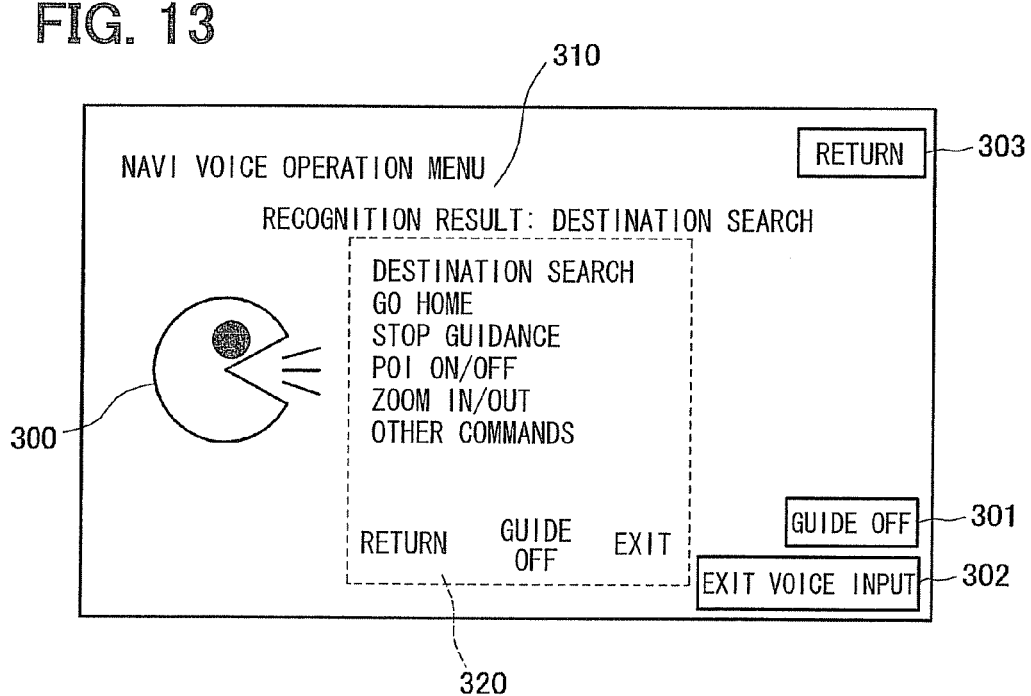
FIG. 13 is a diagram illustrating an example of a second screen display in the guided input mode.

FIG. 13 illustrates an example of a display screen to which the operation is caused to transition when voice input of "Navigation" is done in the screen in FIG. 12 and the screen is in the operation hierarchical layer immediately lower than that in FIG. 12. Also in this example, there are display areas 300, 310, 320 and operation images 301, 302 and an operation image (hierarchical layer transition operation image) 303 for return to the upper operation hierarchical layer is displayed on the screen. In the contents of speech presenting area 320, contents of speech corresponding to operation commands that can be executed in the current operation hierarchical layer are displayed in list form. These contents of speech are recognizable. In addition, the following operation images are displayed: an input mode switching operation image 301, a voice input exit operation image 302, and an operation image (hierarchical layer transition operation image) 303 for return to the upper operation hierarchical layer. The same operations as by these operation images 301 to 303 can also be performed by voice input.

Figure 14:
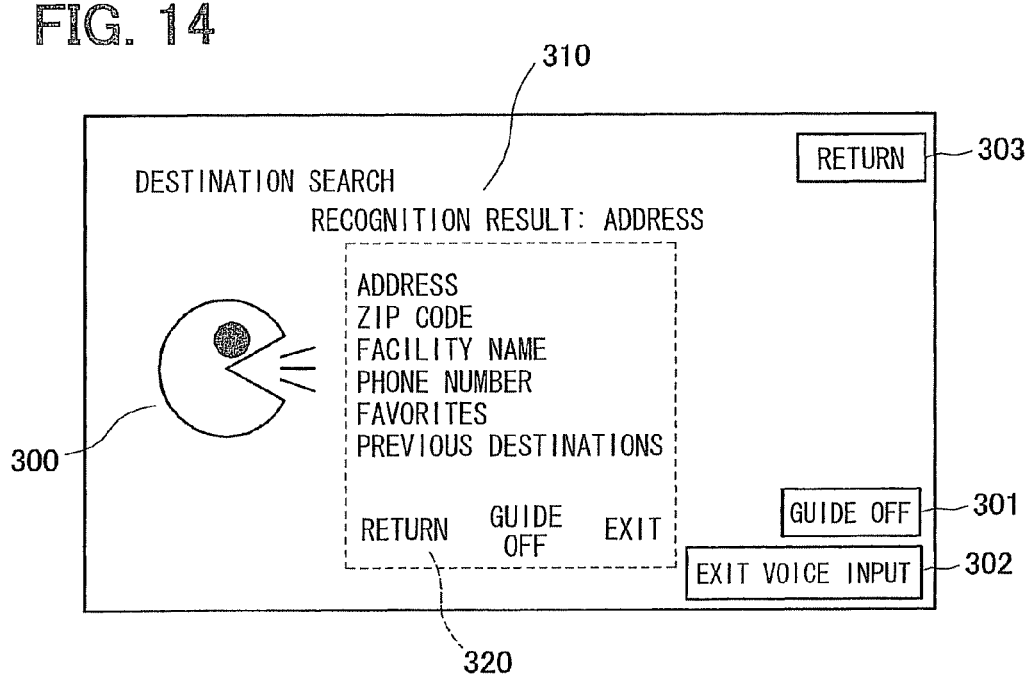
FIG. 14 is a diagram illustrating an example of a third screen display in the guided input mode.

FIG. 14 illustrates an example of a display screen to which the operation is caused to transition when voice input of "Destination search" is done in the screen in FIG. 13 and the screen is in the operation hierarchical layer immediately lower than that in FIG. 13. Also in this example, there are display areas 300, 310, 320 and operation images 301, 302, 303 are displayed on the screen. In the contents of speech presenting area 320, contents of speech corresponding to operation commands that can be executed in the current operation hierarchical layer are displayed in list form and these contents of speech are recognizable. In addition, the following operation images are displayed: an input mode switching operation image 301, a voice input exit operation image 302, and an operation image (hierarchical layer transition operation image) 303 for return to the upper operation hierarchical layer. The same operations as by these images can also be performed by voice input.

Figure 15:
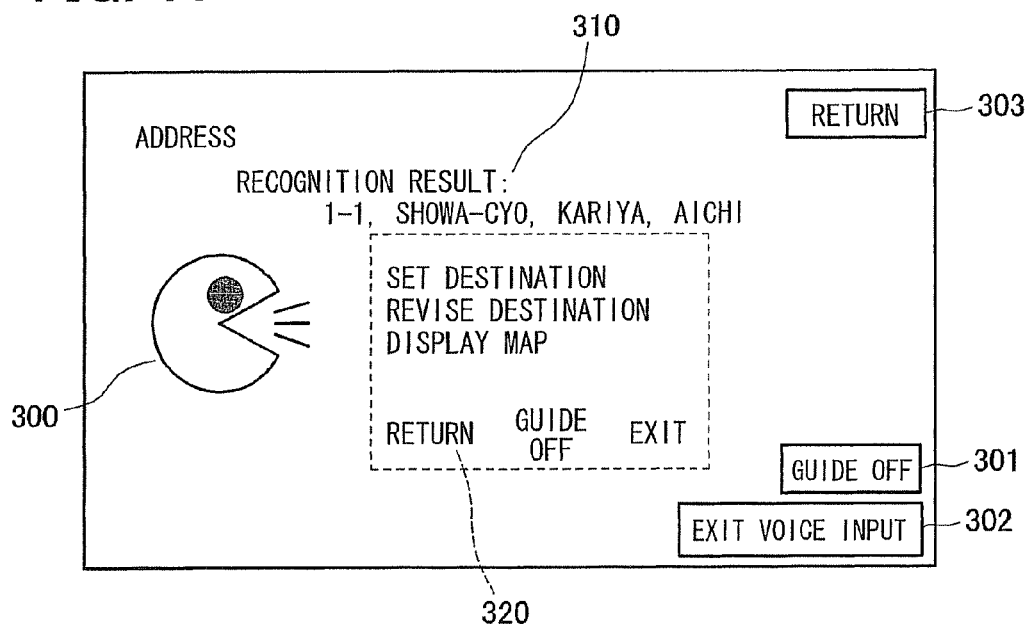
FIG. 15 is a diagram illustrating an example of a fourth screen display in the guided input mode.

FIG. 15 illustrates an example of a display screen to which the operation is caused to transition when voice input of "Address" is done in the screen in FIG. 14 and the screen is in the operation hierarchical layer immediately lower than that in FIG. 14. Also in this example, there are display areas 300, 310, 320 and operation images 301, 302, 303 are displayed on the screen. In the contents of speech presenting area 320, contents of speech corresponding to operation commands that can be executed in the current operation hierarchical layer are displayed in list form and these contents of speech are recognizable. In addition, the following operation images are displayed: an input mode switching operation image 301, a voice input exit operation image 302, and an operation image (hierarchical layer transition operation image) 303 for return to the upper operation hierarchical layer and the same operations as by these images can also be performed by voice input. In this example, voice input of the address of a location as the destination is accepted and the recognition result thereof is displayed in the recognized voice display area 310. Then it is possible to set the recognized address as the destination, revise it, or display a map of that location by voice input.

When the guided input mode is established, there are operation commands that can be executed in each operation hierarchical layer other than those displayed on the screen in lift form at that time and contents of speech corresponding to these operation commands are also recognizable.

A description will be given to the automatic setting processing (input mode setting means) for voice input mode (guided input mode and unguided input mode) carried out by the control unit 11 with reference to FIG. 16.

At Step S1, first, the control unit 11 determines whether to turn on the voice input mode (voice input acceptable state). The control unit makes determination based on whether or not a predetermined turn-on operation has been performed with the voice input start/exit operation unit 17 by the user. Aside from turn-on operation with the operation unit 17, the following measure may be taken: a predetermined on signal is accepted from an external source and the voice input mode is turned on based thereon. When it is determined that the voice input mode is on, the flow proceeds to Step S2; and when it is not determined, this series of processing is terminated.

At Step S2, subsequently, the control unit 11 identifies the mastery level of the user (mastery level identifying means). The control unit 11 reads mastery level information (Refer to FIG. 2) stored in the storage device 16 and thereby identifies the mastery level.

At Step S3, the control unit 11 identifies the timing of establishing the guided input mode based on the identified mastery level. That is, the control unit identifies the timing of switching from the unguided input mode, established when the voice input mode is turned on, to the guided input mode. The control unit reads switching timing information (Refer to FIG. 2 and FIG. 4) stored in the storage device 16. As a result, the switching wait time T from when voice input is started to when the input mode is switched to the guided input mode is determined as the switching timing.

At Step S4, the control unit 11 starts time count. That it, the control unit starts to count the time that lapses after the voice input mode is turned on (start of voice input). When it is not determined that the switching wait time T identified at Step S3 has passed, the control unit 11 establishes the unguided input mode (Step S5: No to Step S6). When it is determined that the switching wait time T has passed, the control unit establishes the guided input mode (Step S5: Yes to Step S7).

At Step S8, the control unit 11 determines whether or not user operation has been performed to establish the unguided input mode or guided input mode (user's manual operation: input mode establishing operation in the drawing). This determination is made based on whether or not the user' operation (touch input or voice input) with the input mode switching operation images 201, 301 shown in FIG. 10 to FIG. 15 and the like has been performed. When it is determined that there is not the user's operation, the flow proceeds to Step S9.

At Step S9, the control unit 11 determines whether to turn off the voice input mode. This determination is made based on the following: whether or not a predetermined time (voice input acceptance time) has passed after time count was started at Step S4 or whether or not a predetermined turn-off operation is performed with the voice input start/exit operation unit 17 by the user. Aside from turn-off operation with the operation unit 17, the following measure may be taken: a predetermined off signal is accepted from an external source and the voice input mode is turned off based thereon. When at Step S9, the control unit 11 determines that the voice input mode is turned off, this series of processing is terminated. When the control unit determines that the voice input mode is not turned off, the flow returns to Step S5.

When it is determined at Step S8 that the user' operation has been performed to establish the unguided input mode or the guided input mode, the control unit 11 proceeds to Step S10 and establishes the input mode (unguided input mode or guided input mode) corresponding to this user's operation. At Step S11, the control unit cancels the time count carried out at Step S4 and starts time count again.

At Step S12, the control unit 11 determines whether to turn off the voice input mode. This determination is made based the following: whether or not a predetermined time (voice input acceptance time) has passed after time count was started at Step S11 or whether or not a predetermined turn-off operation is performed with the voice input start/exit operation unit 17 by the user. The voice input mode may be turned off by accepting a predetermined off signal from an external source. When at Step S12, the control unit 11 determines that the voice input mode is turned off, the series of processing is terminated. When the control unit determines that the voice input mode is not turned off, the processing of Step S12 is repeated until it is determined the voice input mode is turned off.

Even after the termination, this series of processing is repeated at predetermined time intervals.

Figure 16:
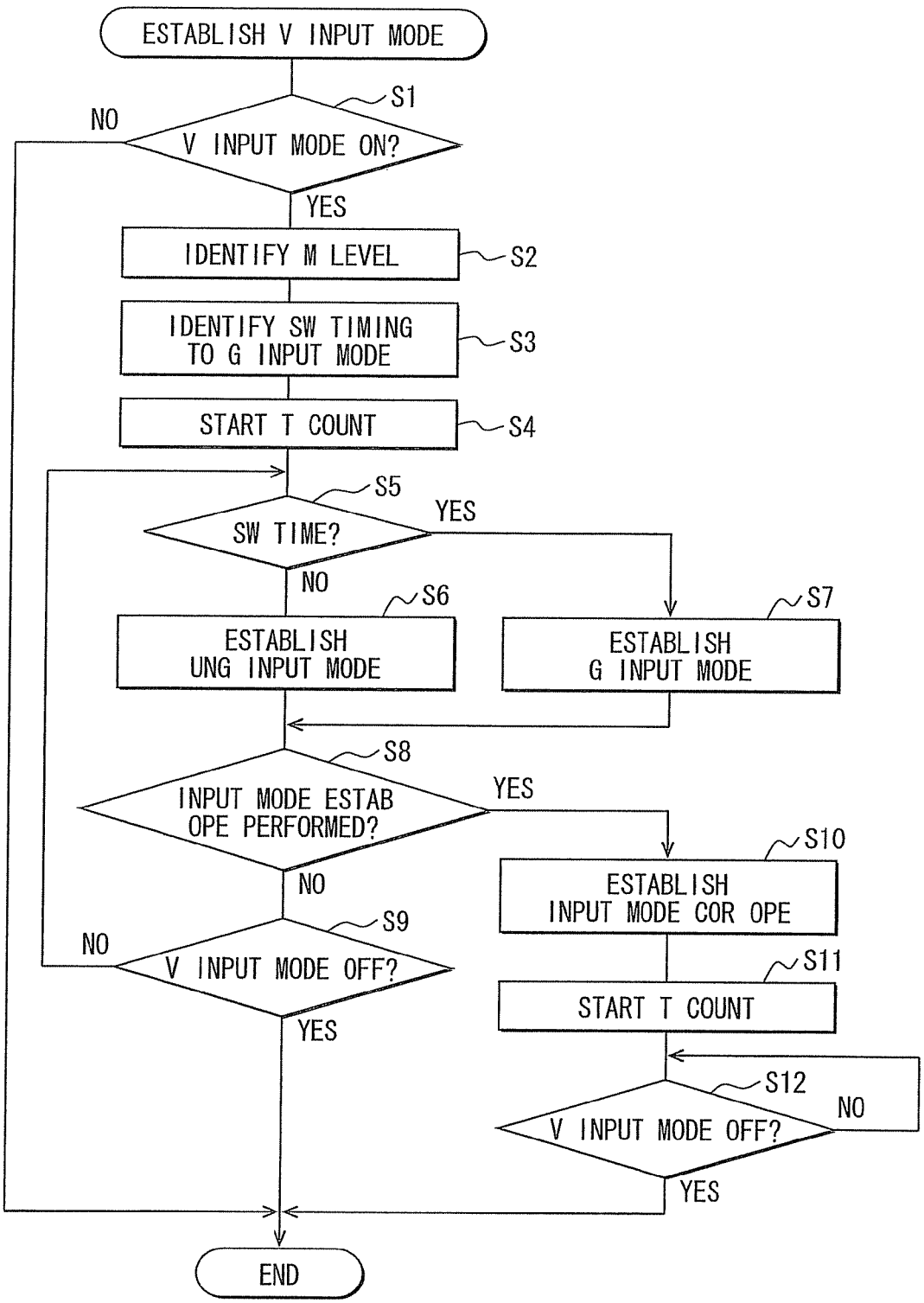
FIG. 16 is a flowchart illustrating the flow of automatic setting processing for the voice input mode.

According to the processing of FIG. 16, the following measure is taken when the voice input mode is switched by the user's operation (voice input or operation with the operation unit): the flow exits from the loop of Step S5 to Step S8 and an input mode corresponding to the operation is established. When the predetermined voice input acceptance time has passed after the establishment, the acceptance of voice input is automatically terminated.

When the voice input mode is switched by the user's operation (voice input or operation with the operation unit), the user asserts that he/she will do voice input. Therefore, the voice input acceptance time (voice input acceptance time on which the determination at Step S12 is made based) from when the operation is performed to when the acceptance of voice input is terminated may be made longer than the following time: the voice input acceptance time (voice input acceptance time on which the determination at Step S9 is made based) taken when the operation is not performed.

A description will be given to the update processing for mastery level information carried out by the control unit 11 with reference to FIG. 17.

At Step S111, first, the control unit 11 determines whether to turn on the voice input mode (voice input acceptable state) based on the result of the determination at Step S1 in FIG. 16. When it is determined that the voice input mode is on, the flow proceeds to Step S112. On the other cases, this series of processing is terminated.

At Step S112, the control unit 11 starts time count. That is, the control unit starts to count the time that lapses after it is determined at Step S1 in FIG. 16 that the voice input mode is on (start of voice input).

At Step S113, the control unit 11 determines whether to turn off the voice input mode based on the result of the determination at Step S9 or Step S12 in FIG. 16. When the voice input mode is turned off, the flow proceeds to Step S114; and when the voice input mode is not turned off, the flow returns to Step S113.

At Step S114 and Step S115, the control unit 11 updates the mastery level information stored in the storage device 16. Specifically, the following measure is taken: the time (mastery level update information) from when time count was started at Step S112 (that is, from when the voice input mode is turned on) to when the voice input mode is turned off at Step S9 or Step S12 in FIG. 16 is computed and acquired; the time is added to the voice input acceptance time summed until now (Step S114); and the summed time is stored in the storage device 16 (Step S115). The mastery level information is thereby updated. When the mastery level information is updated, this series of processing is terminated. Even after the termination, this series of processing is carried out at predetermined time intervals.

Figure 18:
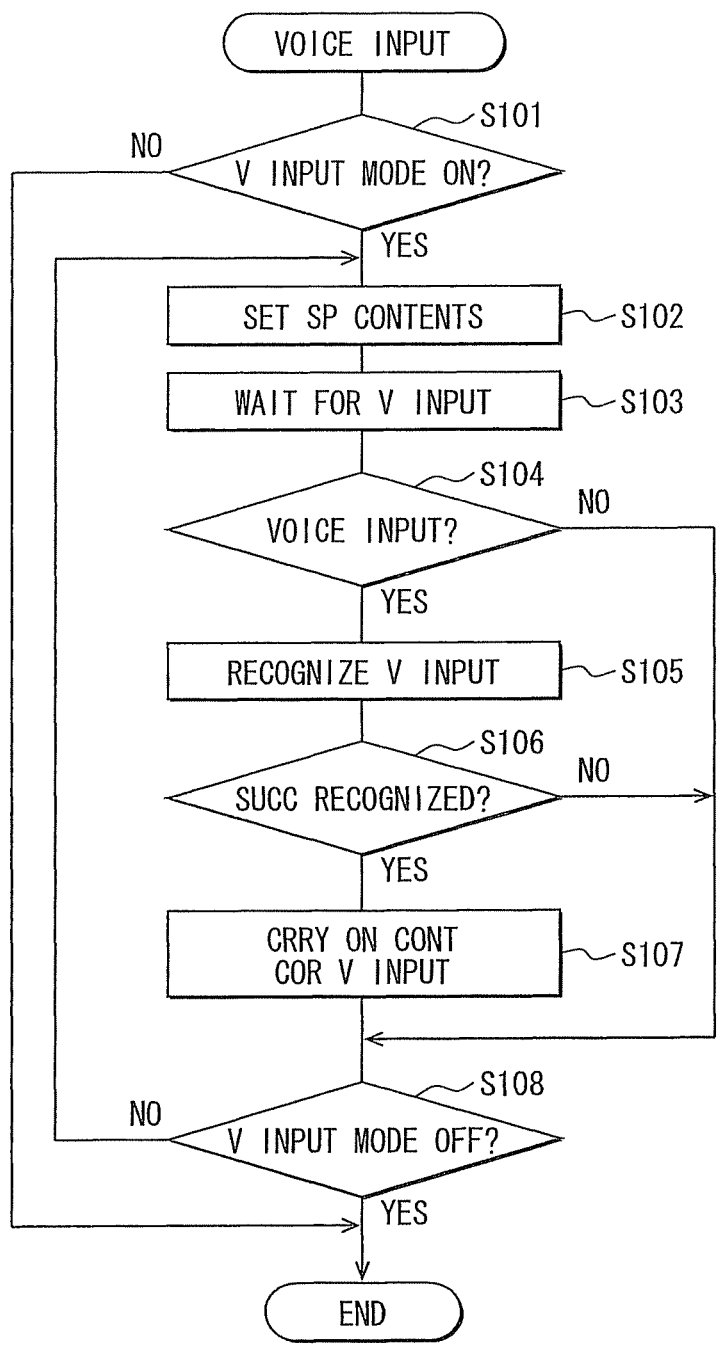
FIG. 18 is a flowchart illustrating the flow of voice input processing.

A description will be given to the voice input processing carried out mainly by the control unit 11 and the voice recognition unit 12 with reference to FIG. 18.

At Step S101, first, the control unit 11 determines whether to turn on the voice input mode (voice input acceptable state) as at Step S1 in FIG. 16. When it is determined that the voice input mode is on, the flow proceeds to Step S2 and on the other cases, this series of processing is terminated.

At Step S102, subsequently, the control unit 11 sets contents of speech that can be inputted by voice input. Since the recognized contents of speech differ depending on the operation hierarchical layer, the control unit 11 carries out the following processing: it refers to information indicating the correspondence between the operation hierarchical layers and the contents of speech for operation (operation hierarchical layer information (FIG. 9) and command table (FIG. 3)) stored in the storage device 16; based on this information, it identifies contents of speech for operation corresponding to the current operation hierarchical layer; and then it instructs the contents of speech for operation to be recognized to the voice recognition unit 12. The voice recognition unit 12 identifies the contents of speech for operation instructed by the control unit 11 from the voice data for collation in the storage unit 12a. At Step S103, driving power to the voice input unit 13 is turned on to establish a voice input waist state.

When voice input occurs in this state (Step S104: Yes), the voice recognition unit 12 identifies whether or not there has been voice input matched with the contents of speech for operation instructed by the control unit 11 (Step S105). When there is matched voice input (Step S106: Yes), the contents of speech are inputted to the control unit 11. The control unit 11 identifies an operation command corresponding to the inputted contents of speech based on the command table (Refer to FIG. 3) stored in the storage device 16 and executes the operation command (Step S107). When there is no voice input or inputted voice is not recognized, the flow proceeds to Step S108.

At Step S108, the control unit 11 determines whether to turn off the voice input mode as at Step S8 in FIG. 16. When the voice input mode is turned off, this series of processing is terminated. When the voice input mode is not turned off, the flow returns to Step S102. Even after the termination, this series of processing is repeated at predetermined time intervals.

In the above embodiment, as mentioned above, the time of automatically switching the input mode from the unguided input mode to the guided input mode is delayed more with increase in the mastery level of each user. When the input mode is switched to the guided input mode, the screen of the display device 4 is switched to a screen dedicated to voice input and a guide display for voice input is provided. Meanwhile, the displays of other functions, such as the map screen 210 (FIG. 10) and the operation screen 230 (FIG. 11) displayed in the unguided input mode, are cut off. When the input mode is switched to the guided input mode, the voice output unit 15 also outputs a guide voice for voice input, which is not outputted in the unguided input mode. That is, since the timing of guide output, such as a guide display or a guide voice for voice input, is delayed, the following advantages are obtained. Users of high mastery levels are less prone to feel bothersome due to guide output. Meanwhile, users of low mastery levels are not perplexed at operation because such guide output is quickly done.

Figure 19:
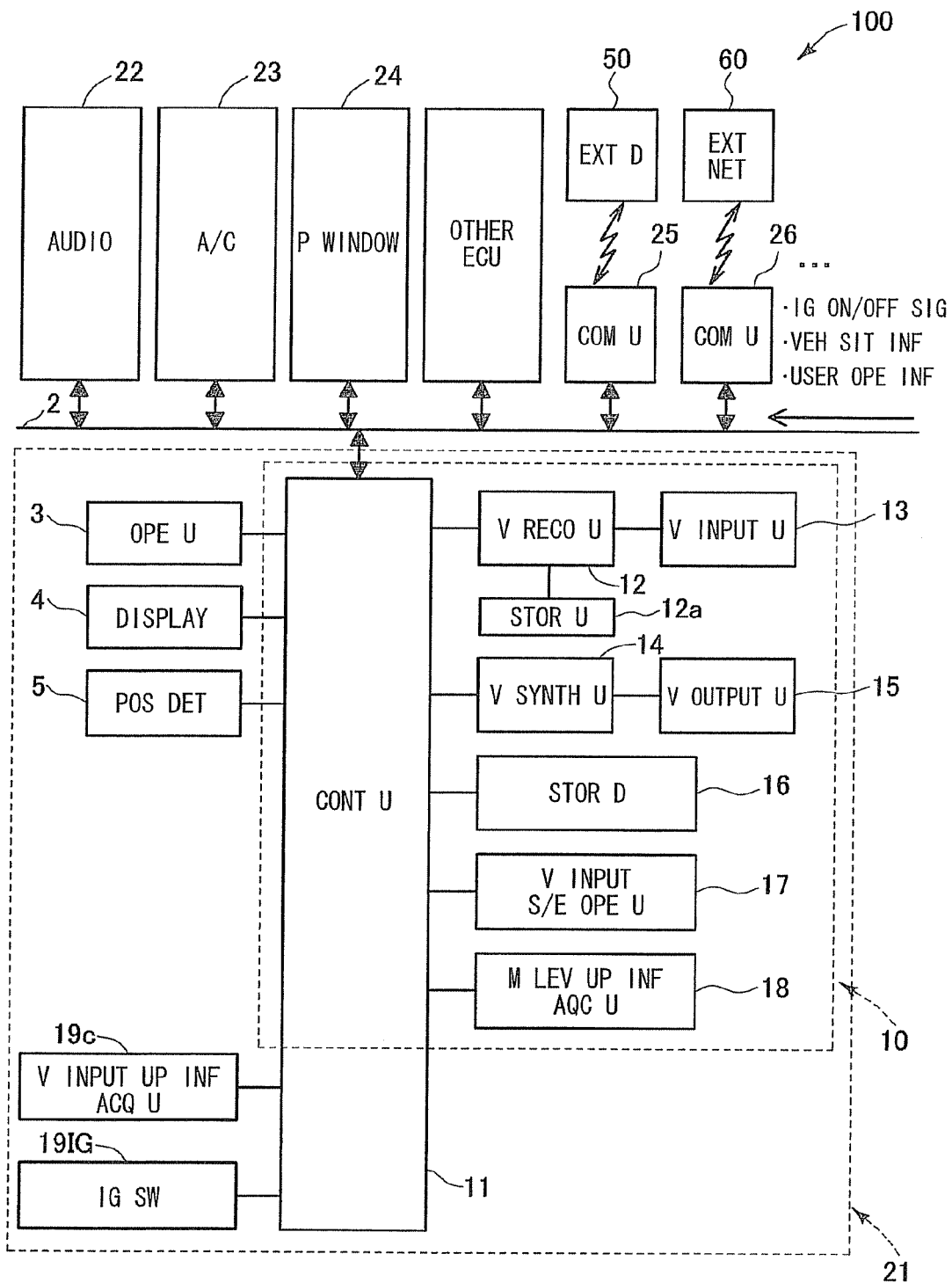
FIG. 19 is a block diagram simply illustrating the configuration of an operation input system equipped with a voice input device in a second embodiment.

FIG. 19 is a block diagram of a second embodiment. Common parts will be marked with the same reference numerals and the description thereof will be omitted.

The second embodiment is so configured that the following measure is taken with respect to the timing of switching from the unguided input mode to the guided input mode, identified based on the mastery level switching timing information in the first embodiment: the switching timing is corrected based on predetermined correction information and the input mode is switched based on the corrected switching timing. More specific description will be given. Depending on the situation of the user, the degree of difficulty in voice input may be increased as compared with ordinary cases. When a predetermined situation in which voice input is difficult is identified, the switching timing (switching wait time T) determined by the mastery level is corrected according to the identified situation.

In the second embodiment, the mastery level is registered on a user-by-user basis. Specifically, each user performs his/her own registration processing by inputting his/her user information (user registering means) and the control unit 11 stores the result of this registration (user registration information) in the storage device 16 in the form shown in FIG. 21 (registered user information storing means). In addition, as shown in FIG. 22, mastery level update information is acquired with respect to each registered user and the control unit 11 stores and updates the mastery level information with respect to each registered user (mastery level storing means).

In the second embodiment, the user is fixed to vehicle driver. The control unit 11 acquires vehicle situation information for identifying a predetermined vehicle situation of the vehicle driven by the user from an external control unit, such as ECU, through the in-vehicle LAN (communication means) 2 by communication (vehicle situation information acquiring means). The predetermined vehicle situation includes, for example, situations in which: the vehicle is approaching an intersection, running on a back road, running during a commute hour, and the like. A situation in which a driving operation burden on a driver as the user is increased as compared with usual situations can be identified from vehicle situation information as the result of detection by the detection unit of each device mounted in the vehicle. For example, running location information for identifying approaching an intersection, back road running, and the like is information that can be acquired from the automobile navigation system 21; and running time period information for identifying a commute hour is also information that can be acquired from time information in the automobile navigation system 21. The vehicle situation information is utilized as the above-mentioned correction information. In this example, correction information (correction parameter A) in which the degree of difficulty in voice input at that time is reflected is stored in the storage device 16 as shown in FIG. 23. That is, the correction information is stored in correspondence with predetermined vehicle situations identified based on vehicle situation information.

In the second embodiment, the control unit 11 acquires user operation information for identifying a predetermined operating situation of each user from an external control unit, such as ECU, through the in-vehicle LAN (communication means) 2 by communication (operation information acquiring means). The predetermined operating situations cited here are, for example, situations in which the user is operating the steering wheel, the accelerator pedal, the brake pedal, or the like of the vehicle. The operating situations further include a situation in which the user is inputting a concrete name, such as an address, by voice and other like situations. These operations impose a heavier operating burden on the driver as the user than the other operations. The result of detection by the operation detection unit of the operation unit (accelerator pedal, brake pedal, steering wheel) of each of the various devices (accelerator device, braking device, steering device, and the like) mounted in the vehicle is acquired as user operation information. The control unit 11 identifies an operating situation from the acquired user operation information. For example, a steering wheel operation can be identified from the result of detection by the steering angle detection sensor of the steering wheel; and an accelerator operation and a braking operation can be identified from the result of detection by the pedal effort detection sensors for detecting pedal effort on the respective pedals. Voice input of a concrete name can be identified by the operation hierarchical layer at that time. The user operation information is utilized as the above-mentioned correction information. In this example, correction information (correction parameter B) in which the degree of difficulty in voice input at that time is reflected is stored in the storage device 16 as shown in FIG. 24. That is, the correction information is stored in correspondence with predetermined user operating situations identified based on user operation information.

With respect to "inputting voice input," the degree of difficulty in voice input basically differs from operation hierarchical layer to operation hierarchical layer. When there are a small number of input candidates and input is done by selecting one from among predetermined input candidates, the user can easily do input. When the user must remember contents to be inputted and bring out a voice, the degree of difficulty is enhanced. For this reason, correction information (correction parameter C) in which the degree of difficulty in voice input in each hierarchical layer is reflected is stored in the storage device 16 as shown in FIG. 25. That is, the correction information is stored in correspondence with each operation hierarchical layer.

The second embodiment includes a voice input performance update information acquisition unit 19c that acquires voice input performance update information for updating each user's voice input performance and the acquisition unit is connected to the control unit 11. The voice input performance cited here is a parameter that indicates more realistic voice input capability than the mastery level (degree of experience) does and it takes a value indicating the proficiency and capability in voice input identified from past voice input. For example, the following concrete parameter can be used for this purpose: the average time from start of a voice input accepting period to when voice input is actually done or the number of times by which voice input is successfully done during a voice input accepting period. In this example, each user's voice input performance is updated based on voice input performance update information acquired by the voice input performance update information acquisition unit 19c (voice input performance updating means); and the updated voice input performance is stored as voice input performance information in the storage device 16 (voice input performance storing means). The voice input performance information is utilized as the above-mentioned correction information. In this example, correction information (correction parameter D) in which voice input performance is reflected is stored in the storage device 16 as shown in FIG. 26. That is, the correction information is stored in correspondence with each registered user. In this example, the voice input performance is the average time from start of a voice input accepting period to when voice input is actually done. The length of each voice input accepting period (voice input acceptance time) is equivalent to voice input performance update information and the voice input performance update information acquisition unit 19c is configured as a time counting means that counts time.

Figure 20:
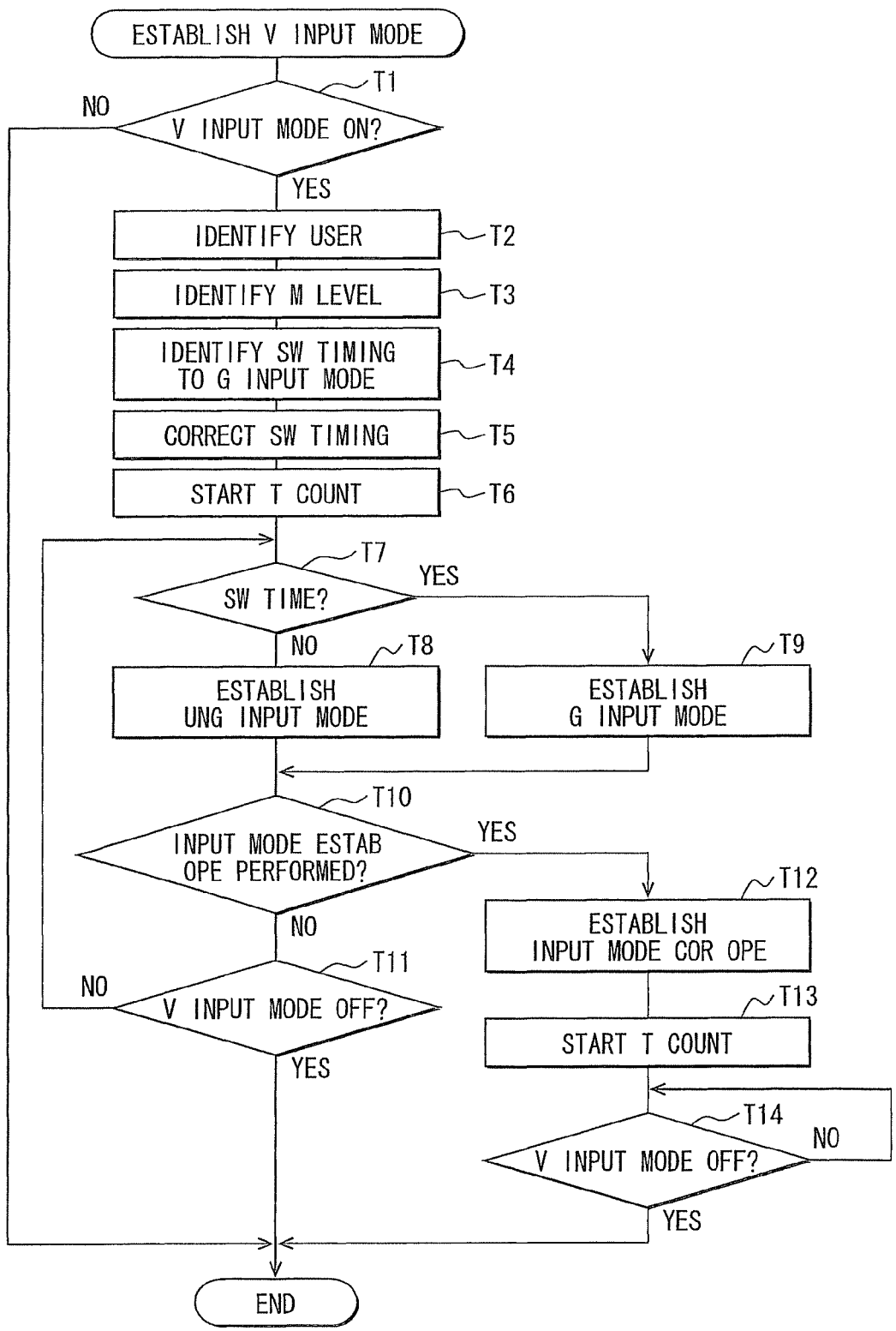
FIG. 20 is a flowchart illustrating the flow of automatic setting processing for the voice input mode, different from that in FIG. 16.

Hereafter, a description will be given to the automatic setting processing (input mode setting means) for the voice input mode (guided input mode and unguided input mode) using these pieces of correction information with reference to FIG. 20.

At Step T1, first, the control unit 11 determines whether to turn on the voice input mode (voice input acceptable state) as at Step S1 in FIG. 16.

At Step T2, the control unit 11 identifies a user who uses the voice input device 10 (registered user identifying means). Specifically, the control unit 11 identifies the user who uses the voice input device 10 by the following processing: publicly known user recognition processing based on voice print, fingerprint, or the like, the processing of specifying previously registered user information carried out by the user himself/herself, or other like processing.

At Step T3, the control unit 11 identifies the mastery level of the identified user (mastery level identifying means). In this example, the control unit 11 reads mastery level information (Refer to FIG. 22) stored in the storage device 16 and thereby identifies the mastery level of the user identified at Step T2.

At Step T4, the control unit 11 identifies the timing of setting the guided input mode based on the identified mastery level of the user. In this example, switching timing information (Refer to FIG. 4) stored in the storage device 16 is read and a switching wait time T is determined based on the read switching timing information and the user's mastery level identified at Step T3.

At Step T5, the control unit 11 corrects the switching wait time T based on predetermined correction information. In this example, there are the correction parameters A, B, C, D (FIG. 23 to FIG. 26) as the correction information. The control unit 11 acquires vehicle situation information and identifies a predetermined vehicle situation of the vehicle driven by the identified user based on the acquired vehicle situation information (vehicle information identifying means). The control unit 11 acquires user operation information and identifies a predetermined vehicle situation of the vehicle driven by the identified user based on the acquired user operation information (vehicle information identifying means). Further, the control unit refers to correction information in FIG. 23 and identifies the correction parameter A corresponding to the identified vehicle situation. Further, the control unit 11 acquires user operation information and identifies an operating situation of the identified user based on the acquired user operation information (operating situation identifying means). Further, the control unit 11 refers to correction information in FIG. 24 and thereby identifies the correction parameter B corresponding to the identified vehicle situation. Further, the control unit 11 identifies the current operation hierarchical layer (current operation hierarchical layer identifying means) and refers to correction information in FIG. 25 to identify the correction parameter C corresponding to the identified vehicle situation. Further, the control unit 11 reads voice input performance information from the storage device 16 and identifies the voice input performance of the identified user based thereon (voice input performance identifying means). Further, the control unit refers to correction information in FIG. 26 and thereby identifies the correction parameter D corresponding to the identified vehicle situation. The control unit multiples the switching wait time T obtained at Step T4 by these correction parameters A to D and thereby corrects the switching wait time T. That is, the control unit computes the switching wait time T by the expression of switching wait time T=A×B×C×D×T.

The subsequent steps, Step T6 to Step T14, are the same as Step S4 to Step S12 in FIG. 16. In this example, all the correction parameters A to D are used. Instead, only some of them may be used or any other correction parameter may be used.

Hereafter, a description will be given to modifications to the first and second embodiments.

Figure 27:
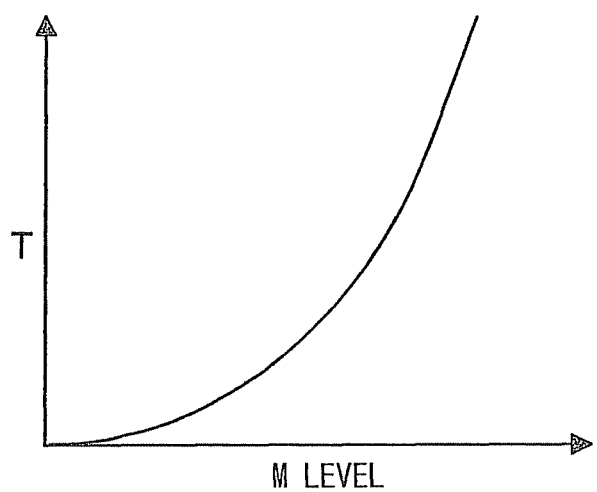
FIG. 27 is a diagram showing switching timing information, different from that in FIG. 4.
Figure 28:
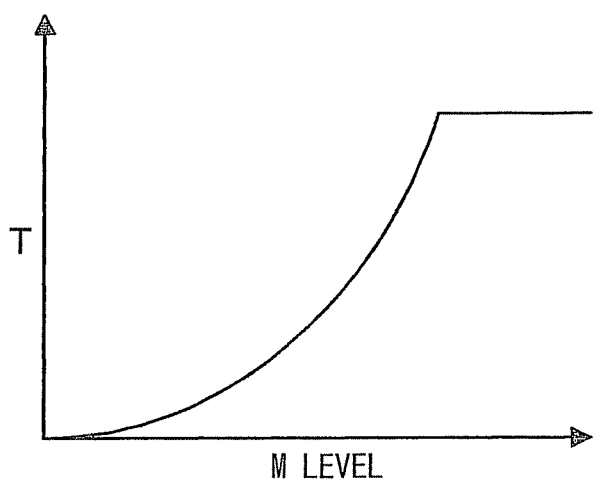
FIG. 28 is a diagram illustrating switching timing information, different from those in FIG. 4 and FIG. 27.
Figure 29:
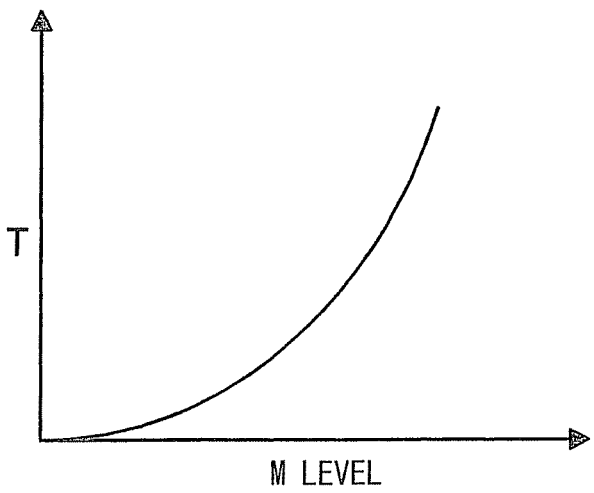
FIG. 29 is a diagram illustrating switching timing information, different from those in FIG. 4, FIG. 27, and FIG. 28.

In the first and second embodiments, as illustrated in FIG. 4, multiple mastery levels are discretely provided as switching timing information and a switching wait time T is brought into correspondence with each of these levels. Instead, the following continuous correspondence may be provided: the correspondence in which the switching wait time T, or the timing of switching from the unguided input mode to the guided input mode, is lengthened with increase in mastery level. For example, as shown in FIG. 27, FIG. 28, and FIG. 29, such correspondence that the switching wait time T is increased at an accelerating rate (it is quadratically increased in these drawings) with increase in mastery level may be provided. As shown in FIG. 28, the switching timing information may be so configured that the switching wait time T becomes constant when the mastery level reaches a certain level or higher. As shown in FIG. 29, the switching timing information may be so configured that the input mode is not switched to the guided input mode when the mastery level reaches a certain level or higher.

In the first and second embodiments, the mastery level is so configured that the following is implemented: the control unit 11 identifies it as a higher level with increase in the length of the total time of voice input acceptance times for which the voice input unit 13 for inputting a voice brought out by a user accepts voice input. The mastery level need not be related only to voice input acceptance time and can be related to a time so determined that at least voice input acceptance time is included.

For example, the mastery level may be so configured that it is identified as a higher level with increase in the length of the following total operating time: total operating time for which a device or a system equipped with the voice input unit 13 for inputting a voice brought out by a user is in operation. (An example of this device is the voice input device 10.) (Examples of this system are the automobile navigation system 21, audio system 22, air conditioner 23, power window device 24, communication units 25, 26, . . . equipped with the voice input device 10 and the entire vehicle system equipped therewith.) For example, the power-on time can be taken as the above operating time. With respect to devices mounted in the vehicle or the entire vehicle system, the time for which the power supply of the accessories or the ignition power supply of the vehicle is on can be taken as the operating time. The voice input accepting period refers to the time until which the power-on duration passes and the total time thereof refers to the time obtained by summing voice input accepting periods established on various occasions.

The mastery level may be configured so that the following is implemented: the control unit 11 identifies it as a higher level with increase in the total number of times by which the voice input unit 13 for inputting a voice brought out by a user is brought into a voice input accepting state. The mastery level in the first and second embodiments may be so configured that the following is implemented: the mastery level is identified as a higher level with increase in the total number of times by which a device or a system equipped with the voice input unit 13 for inputting a voice brought out by a user is brought into operation. With these configurations, the mastery level (degree of experience) of each user with respect to the voice input device can be easily acquired by the following number of times: the number of times by which a device or a system including the voice input device is used or the number of times by which a voice input accepting state is established.

Figure 17:
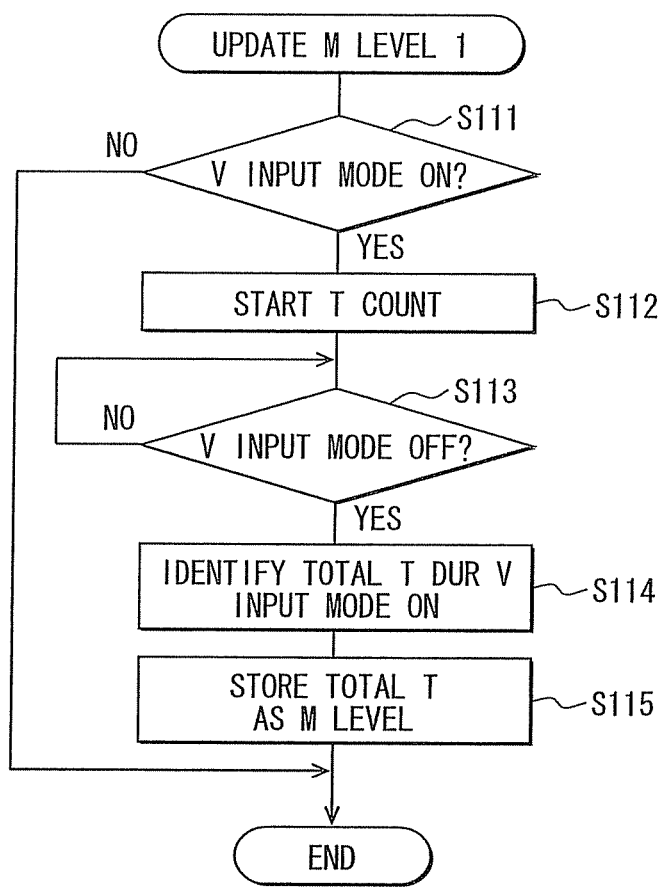
FIG. 17 is a flowchart illustrating the flow of update processing for mastery level information.
Figure 30:
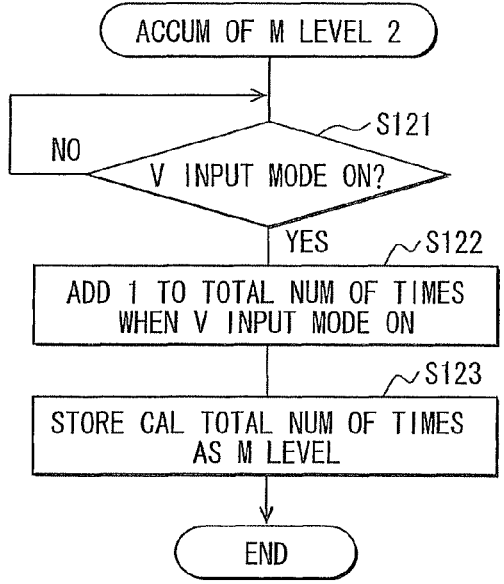
FIG. 30 is a flowchart illustrating the flow of update processing for mastery level information, different from that in FIG. 17.
Figure 31:
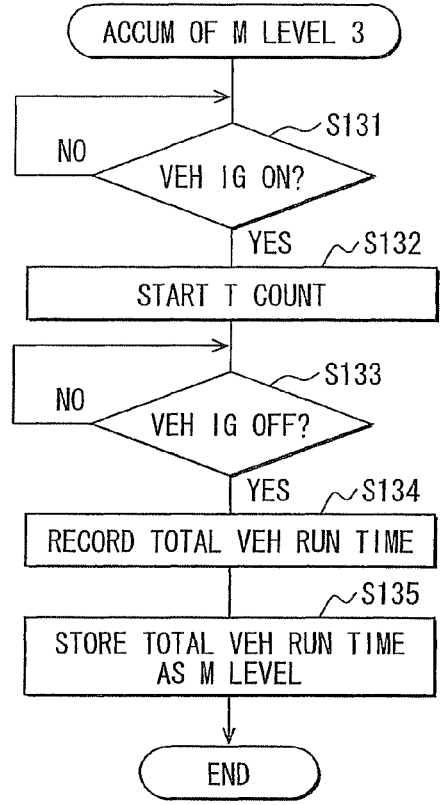
FIG. 31 is a flowchart illustrating the flow of update processing for mastery level information, different from those in FIG. 17 and FIG. 30.
Figure 32:
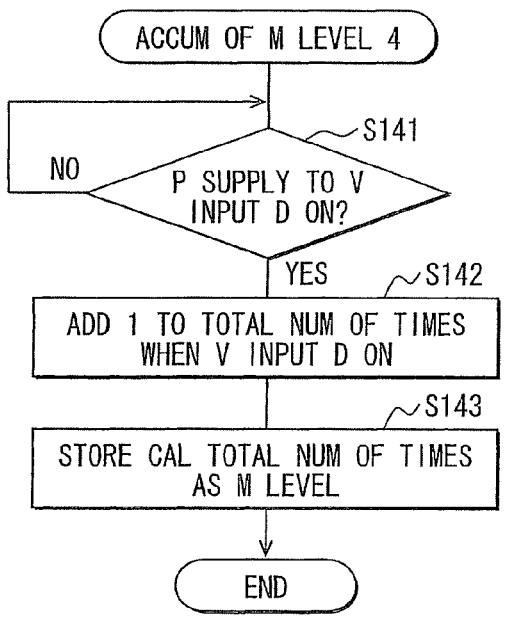
FIG. 32 is a flowchart illustrating the flow of update processing for mastery level information, different from those in FIG. 17, FIG. 30, and FIG. 31.

Specifically, the mastery level update processing in the first and second embodiments, illustrated in FIG. 17, can be configured as illustrated in, for example, FIG. 30, FIG. 31, or FIG. 32.

In the example in FIG. 30, first, the control unit 11 determines whether to turn on the voice input mode (voice input acceptable state) as at Step S111 in FIG. 17 (Step S121). When it is determined that the voice input mode is on, the control unit adds 1 to the total number of times by which the voice input mode has been turned on up to now (Step S122). Then the control unit stores the result of the addition as mastery level information in the storage device 16 (Step S123).

In the example in FIG. 31, first, the control unit 11 determines whether or not the ignition power supply (IG) as a main driving power supply of the vehicle system equipped with the voice input device 10 has been turned on (Step S131). When the ignition power supply is turned on (Step S131: Yes), the control unit 11 starts time count (Step S132). Thereafter, the control unit 11 determines whether or not the ignition power supply has been turned off (Step S133). Turn-on/off of the ignition power supply is recognized by receiving an on/off signal inputted based on operation with the ignition switch 191G (Refer to FIG. 27): a predetermined ECU (for example, engine ECU) connected to the control unit 11 through a communication means, such as the in-vehicle LAN 2, or the ignition switch. Then the time from when time count is started at Step S131 (that is, the ignition power supply is turned on) to when the time count is terminated at Step S133 (the ignition power supply is turned off) is added to the following total time summed up to now: the total time for which the ignition power supply is on (Step S134). The resulting total time is stored as mastery level information in the storage device 16 (Step S135).

In the example in FIG. 32, first, the control unit 11 determines whether or not the driving power supply to the voice input device 10 has been turned on (Step S141). When the driving power supply has been turned on (Step S141: Yes), the control unit adds 1 to the total number of times by which the voice input device 10 has been started up to now (Step S142). Then the control unit stores the resulting total number of times as mastery level information in the storage device 16 (Step S143).

The first and second embodiments may be so configured that a noise limiter circuit, an automatic gain adjustment circuit, or the like is added as a preprocessing unit between the voice input unit 13 and the voice recognition unit 12.

The first and second embodiments may be so configured that the following is implemented when the guided input mode is established: registered contents of speech corresponding to the operation commands provided for the currently established operation hierarchical layer are presented and only these operation commands can be executed by voice input.

The above disclosure has the following aspects.

According to an example aspect of the present disclosure, a voice input device for receiving a voice input from a user and for executing an operation command based on the voice input, includes: a mastery level identifying device identifying a mastery level of the user with respect to the voice input; and an input mode setting device switching and setting a voice input mode between a guided input mode and an unguided input mode. In the guided input mode, preliminary registered contents of the voice input are presented to the user. In the unguided input mode, the preliminary registered contents of the voice input are not presented. The input mode setting device sets the voice input mode to the unguided input mode at a starting time when the voice input device starts to receive the voice input. The input mode setting device switches the voice input mode from the unguided input mode to the guided input mode at a switching time. The input mode setting device sets a time interval between the starting time and the switching time in proportion to the mastery level.

In the above device, a user's perplexity in operating the voice input device is identified by the time that has lapsed after start of the acceptance of voice input. When an estimated time for which the user may be in perplexity passes, the guided input mode is automatically established and the user does not feel bothersome. Thus, the elapsed time on which determination of whether or not a user is in perplexity is based is set to a longer time with increase in the mastery level (degree of experience). The higher the user's mastery level is, the later the guided input mode is established. Therefore, the input mode is not switched to the guided input mode for beginners with such timing that a user high in the mastery level feels bothersome. For beginners, the input mode is switched to the guided input mode relatively early and this shortens the time for which he/she is in perplexity in operation; therefore, he/she will not be in perplexity about what he/she should input by voice.

Alternatively, the voice input device may further include: a voice input unit receiving the voice input from the user and inputting the voice input to the voice input device. The user inputs voice for a predetermined time interval so that the voice input unit receives the voice input for the predetermined time interval, which is defined as voice input acceptance time. The mastery level identifying device identifies the mastery level in such a manner that the mastery level is in proportion to a total time of the voice input acceptance time. In this case, a user's mastery level (degree of experience) with respect to the voice input device can be easily acquired by the following: the length of the time for which a device or a system so configured as to include the voice input device is used or the length of the voice input accepting state.

Alternatively, the voice input device may further include: a voice input unit receiving the voice input from the user and inputting the voice input to the voice input device. The mastery level identifying device identifies the mastery level in such a manner that the mastery level is in proportion to a total number of times the voice input device starts to receive the voice input. In this case, a user's mastery level (degree of experience) with respect to the voice input device can be easily acquired by the following: the number of times by which a device or a system so configured as to include the voice input device is used or the number of times by which a voice input accepting state is established.

Alternatively, the voice input device may further include: a switching timing storing device storing switching timing information. The switching timing information represents a relationship between the mastery level and the time interval. The input mode setting device switches the input mode based on the switching timing information. In this case, the input mode setting device can be so configured as to switch the input mode based on the switching timing information. According to the foregoing, the timing of establishing the guided input mode corresponding to a mastery level can be easily acquired just by referring to the correspondence between mastery levels and switching wait times; therefore, the input mode can be easily switched.

Alternatively, the mastery level in the switching timing information may include a plurality of discrete levels. Each discrete level is in association with the time interval. In this case, wait times for switching to the guided input mode are respectively set to a predetermined limited number of mastery levels in multiple stages. Therefore, the device can be implemented with a relatively simple configuration.

Alternatively, the mastery level may be a continuous level. The switching timing information represents a continuous relationship between the mastery level and the time interval in such a manner that the mastery level is in proportion to the time interval. In this case, as the mastery level is continuously increased, the wait time for switching to the guided input mode is accordingly continuously increased. Therefore, more detailed switching wait times can be set and users of various mastery levels can be satisfied.

Alternatively, the switching timing information may represent the relationship between the mastery level and the time interval in such a manner that the time interval becomes constant when the mastery level is equal to or higher than a predetermined level. In this case, the switching wait time may be made equivalent to the infinite to prevent the occurrence of switching to the guided input mode. The mastery level is increased with increase in the duration of use of the voice input device. Therefore, when the mastery level becomes too high, the wait time for switching to the guided input mode is increasingly lengthened. Too long a switching wait time is useless. Providing the switching wait time with an upper limit can eliminate a useless configuration, for example, useless time count processing can be omitted.

Alternatively, the switching timing information may represent the relationship between the mastery level and the time interval in such a manner that the time interval is zero when the mastery level is the lowest mastery level. In this case, when the acceptance of voice input is started, the guided input mode is immediately established without establishing the unguided input mode. This makes it possible to provide a user of the lowest mastery level with the guided input mode from the beginning. This makes the voice input device easy for users of low mastery levels to use.

Alternatively, the voice input device may include: a user registering device carrying out user registration by registering user information; a registered user identifying device identifying a registered user; and a mastery level storing device storing the mastery level of each registered user. The mastery level identifying device identifies the mastery level of one of users, which is identified by the registered user identifying device. The input mode setting device switches the input mode based on the mastery level of an identified user and the switching timing information. In this case, a mastery level is stored with respect to each user and wait times for switching to the guided input mode can be set in accordance with various users.

Alternatively, the input mode setting device may correct the switching timing information based on predetermined correction information, and switches the voice input mode from the unguided input mode to the guided input mode at the switching time, which is determined by corrected switching timing information and the mastery level. In this case, the timing of switching to the guided input mode can be flexibly changed according to the situation of each user. The degree of difficulty in voice input may be increased as compared with ordinary cases depending on the situation of each user. Therefore, when such a predetermined situation as mentioned above in which voice input becomes difficult is identified, the switching timing is corrected according to the identified situation so that the following is implemented: the switching timing (switching wait time T) determined by the mastery level is delayed, that is, the wait time is lengthened. This enhances the usability of the device. For example, when the following operation hierarchical structure is configured, the correction information can be determined with respect to each of the operation hierarchical layers. This makes it possible to set switching timing information suitable for each operation hierarchical layer.

Alternatively, the preliminary registered contents of the voice input may have a hierarchical structure, which includes a plurality of operation hierarchical layers. Each operation hierarchical layer includes one or more operation command items that are executable according to the voice input when the input mode setting device switches the voice input mode to the guided input mode. Each operation hierarchical layer includes a hierarchical layer transition operation command item for transiting a current operation hierarchical layer to an upper or lower operation hierarchical layer. The operation hierarchical layers are switchable from the highest operation hierarchical layer to any one of lowest operation hierarchical layers via one or more branch operation hierarchical layers by repeating to execute a hierarchical layer transition operation command item in each operation hierarchical layer. The predetermined correction information is defined in each operation hierarchical layer. In this case, operation commands relevant to one another can be systematized by the hierarchical structure; therefore, a user can easily arrive at an intended operation command. With this operation hierarchical structure formed, the device can be so configured that the following can be implemented when the guided input mode is established: the registered contents of speech corresponding to the operation commands provided for the currently set operation hierarchical layer are presented and only these operation commands can be executed by the voice input. With this configuration, the contents of speech that can be inputted by voice are narrowed down with respect to each operation hierarchical layer and they can be easily presented to users. In addition, beginners' erroneous input by vague voice input can be prevented. This operation hierarchical structure can be formed by classifying operation hierarchical layers lower than a predetermined menu layer among the operation hierarchical layers according to the type of operation command. In this case, the device is provided with multiple hierarchical layer transition commands for causing transition to a lower operation hierarchical layer of the corresponding type by selecting a classified type in the relevant menu layer. Thus when the unguided input mode is established, the following operation commands can be executed by voice input in an operation hierarchical layer lower than the relevant menu layer: the operation commands provided for the operation hierarchical layer and all or some of the operation commands of the type to which the operation hierarchical layer belongs. As a result, a user of a high mastery level can directly execute his/her intended operation command by voice input even when the operation command is provided for an operation hierarchical layer lower than the current operation hierarchical layer. This makes the device excellent in operability.

Alternatively, the voice input device may further include: a voice input performance identifying device identifying voice input performance of the user. The correction information is determined according to the voice input performance. In this case, the voice input performance is a parameter indicating voice input capability more realistic than the mastery level (degree of experience) of voice input. The voice input performance takes a value indicating the proficiency and capability in voice input identified from past voice input performance. For example, the following can be taken as a concrete parameter: the average time from start of a voice input accepting period to when voice input is done in past voice input; or the number of times by which voice input is successfully done during a voice input accepting period. With this configuration, for example, the following measure can be taken: for users high in voice input performance, the timing of switching to the unguided input mode is delayed from the timing based on the mastery level; or for users low in voice input performance, the timing of switching to the unguided input mode is advanced from the timing based on the mastery level.

Alternatively, the voice input device may further include: an operating situation identifying device identifying a predetermined operating situation of the user among a plurality of operation situations. The correction information is defined in each operating situation. In this case, when a situation in which a user directs his/her concentration to any other thing, for example, the user is performing any other operation, is identified as the user's operating situation, it is difficult for him/her to immediately do voice input. (Examples of such situations are those in which the user is operating the steering wheel, the accelerator pedal, the brake pedal, or the like.) With the above-mentioned configuration, the timing of switching to the unguided input mode can be delayed from the timing computed based on the mastery level in these cases.

Alternatively, the user may be the driver of a vehicle. The voice input device further includes: a vehicle situation identifying device identifying a predetermined vehicle situation of the vehicle driven by the user among a plurality of vehicle situations. The correction information is defined in each vehicle situation. In this case, when the vehicle situation is that the driver as the user directs or should direct his/her concentration to the driving situation (for example, he/she is driving in an intersection, on a back road, or the like), it is difficult for him/her to do voice input in parallel. In these cases, the timing of switching to the unguided input mode can be delayed from the timing based on the mastery level.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A voice input device for receiving a voice input from a user and for executing an operation command based on the voice input, comprising:
    a mastery level identifying device identifying a mastery level of the user with respect to the voice input; and
    an input mode setting device switching and setting a voice input mode between a guided input mode and an unguided input mode,
    wherein, in the guided input mode, preliminary registered contents of the voice input are presented to the user,
    wherein, in the unguided input mode, the preliminary registered contents of the voice input are not presented,
    wherein the input mode setting device sets the voice input mode to the unguided input mode at a starting time when the voice input device starts to receive the voice input,
    wherein the input mode setting device switches the voice input mode from the unguided input mode to the guided input mode at a switching time, and
    wherein the input mode setting device sets a time interval between the starting time and the switching time in proportion to the mastery level; the voice input device further comprising:
    a switching timing storing device storing switching timing information,
    wherein the switching timing information represents a relationship between the mastery level and the time interval, and
    wherein the input mode setting device switches the input mode based on the switching timing information.

2. The voice input device according to claim 1, further comprising:
    a voice input unit receiving the voice input from the user and inputting the voice input to the voice input device,
    wherein the user inputs voice for a predetermined time interval so that the voice input unit receives the voice input for the predetermined time interval, which is defined as voice input acceptance time, and
    wherein the mastery level identifying device identifies the mastery level in such a manner that the mastery level is in proportion to a total time of the voice input acceptance time.

3. The voice input device according to claim 1, further comprising:
    a voice input unit receiving the voice input from the user and inputting the voice input to the voice input device,
    wherein the mastery level identifying device identifies the mastery level in such a manner that the mastery level is in proportion to a total number of times the voice input device starts to receive the voice input.

4. The voice input device according to claim 1,
    wherein the mastery level in the switching timing information includes a plurality of discrete levels,
    wherein each discrete level is in association with the time interval.

5. The voice input device according to claim 1,
    wherein the mastery level is a continuous level, and
    wherein the switching timing information represents a continuous relationship between the mastery level and the time interval in such a manner that the mastery level is in proportion to the time interval.

6. The voice input device according to claim 4,
    wherein the switching timing information represents the relationship between the mastery level and the time interval in such a manner that the time interval becomes constant when the mastery level is equal to or higher than a predetermined level.

7. The voice input device according to claim 4,
wherein the switching timing information represents the relationship between the mastery level and the time interval in such a manner that the time interval is zero when the mastery level is the lowest mastery level.

8. The voice input device according to claim 1, further comprising:
a user registering device carrying out user registration by registering user information;
a registered user identifying device identifying a registered user; and
a mastery level storing device storing the mastery level of each registered user,
wherein the mastery level identifying device identifies the mastery level of one of users, which is identified by the registered user identifying device, and
wherein the input mode setting device switches the input mode based on the mastery level of an identified user and the switching timing information.

9. The voice input device according to claim 1,
wherein the input mode setting device corrects the switching timing information based on predetermined correction information, and switches the voice input mode from the unguided input mode to the guided input mode at the switching time, which is determined by corrected switching timing information and the mastery level.

10. The voice input device according to claim 9,
wherein the preliminary registered contents of the voice input have a hierarchical structure, which includes a plurality of operation hierarchical layers,
wherein each operation hierarchical layer includes one or more operation command items that are executable according to the voice input when the input mode setting device switches the voice input mode to the guided input mode,
wherein each operation hierarchical layer includes a hierarchical layer transition operation command item for transiting a current operation hierarchical layer to an upper or lower operation hierarchical layer,
wherein the operation hierarchical layers are switchable from the highest operation hierarchical layer to any one of lowest operation hierarchical layers via one or more branch operation hierarchical layers by repeating to execute a hierarchical layer transition operation command item in each operation hierarchical layer, and
wherein the predetermined correction information is defined in each operation hierarchical layer.

11. The voice input device according to claim 9, further comprising:
a voice input performance identifying device identifying voice input performance of the user,
wherein the correction information is determined according to the voice input performance.

12. The voice input device according to claim 9, further comprising:
an operating situation identifying device identifying a predetermined operating situation of the user among a plurality of operation situations,
wherein the correction information is defined in each operating situation.

13. The voice input device according to claim 9,
wherein the user is the driver of a vehicle,
the voice input device further comprising:
a vehicle situation identifying device identifying a predetermined vehicle situation of the vehicle driven by the user among a plurality of vehicle situations,
wherein the correction information is defined in each vehicle situation.

* * * * *